(12) United States Patent
Yamamoto et al.

(10) Patent No.: US 10,976,861 B2
(45) Date of Patent: Apr. 13, 2021

(54) DETECTION DEVICE AND DISPLAY DEVICE

(71) Applicant: Japan Display Inc., Tokyo (JP)

(72) Inventors: Kisho Yamamoto, Tokyo (JP); Naoki Takada, Tokyo (JP); Hiroshi Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/725,408

(22) Filed: Dec. 23, 2019

(65) Prior Publication Data

US 2020/0210066 A1 Jul. 2, 2020

(30) Foreign Application Priority Data

Dec. 28, 2018 (JP) .............................. JP2018-248626

(51) Int. Cl.
*G06F 3/041* (2006.01)
*G06F 3/044* (2006.01)

(52) U.S. Cl.
CPC ...... *G06F 3/041662* (2019.05); *G06F 3/0446* (2019.05); *G06F 3/0448* (2019.05); *G06F 2203/04101* (2013.01); *G06F 2203/04112* (2013.01)

(58) Field of Classification Search
None
See application file for complete search history.

(56) References Cited

U.S. PATENT DOCUMENTS

| 2013/0342498 | A1 | 12/2013 | Kim et al. | |
| 2014/0049486 | A1 | 2/2014 | Kim et al. | |
| 2014/0049508 | A1 | 2/2014 | Kim et al. | |
| 2014/0174902 | A1* | 6/2014 | Yang | H03K 17/9622 200/600 |
| 2015/0317008 | A1* | 11/2015 | Chandran | G06F 3/044 345/174 |
| 2015/0324027 | A1* | 11/2015 | Heo | G06F 3/041 345/173 |
| 2015/0331288 | A1* | 11/2015 | Hsieh | G02F 1/133514 349/12 |
| 2019/0056834 | A1* | 2/2019 | Blondin | G06F 3/04164 |

* cited by examiner

*Primary Examiner* — Amare Mengistu
*Assistant Examiner* — Sarvesh J Nadkarni
(74) *Attorney, Agent, or Firm* — K&L Gates LLP

(57) ABSTRACT

According to an aspect, a detection device includes: a plurality of first sensor electrodes disposed side by side in a first direction and a second direction intersecting the first direction; and a plurality of second sensor electrodes disposed side by side in the first direction and the second direction. One of the second sensor electrodes overlaps a plurality of first sensor electrodes out of the first sensor electrodes in planar view. Each of the second sensor electrodes has a plurality of electric-field transmission regions. One of the electric-field transmission regions overlaps a corresponding one of the first sensor electrodes in planar view and does not straddle two first sensor electrodes in planar view.

20 Claims, 32 Drawing Sheets

FIG.31
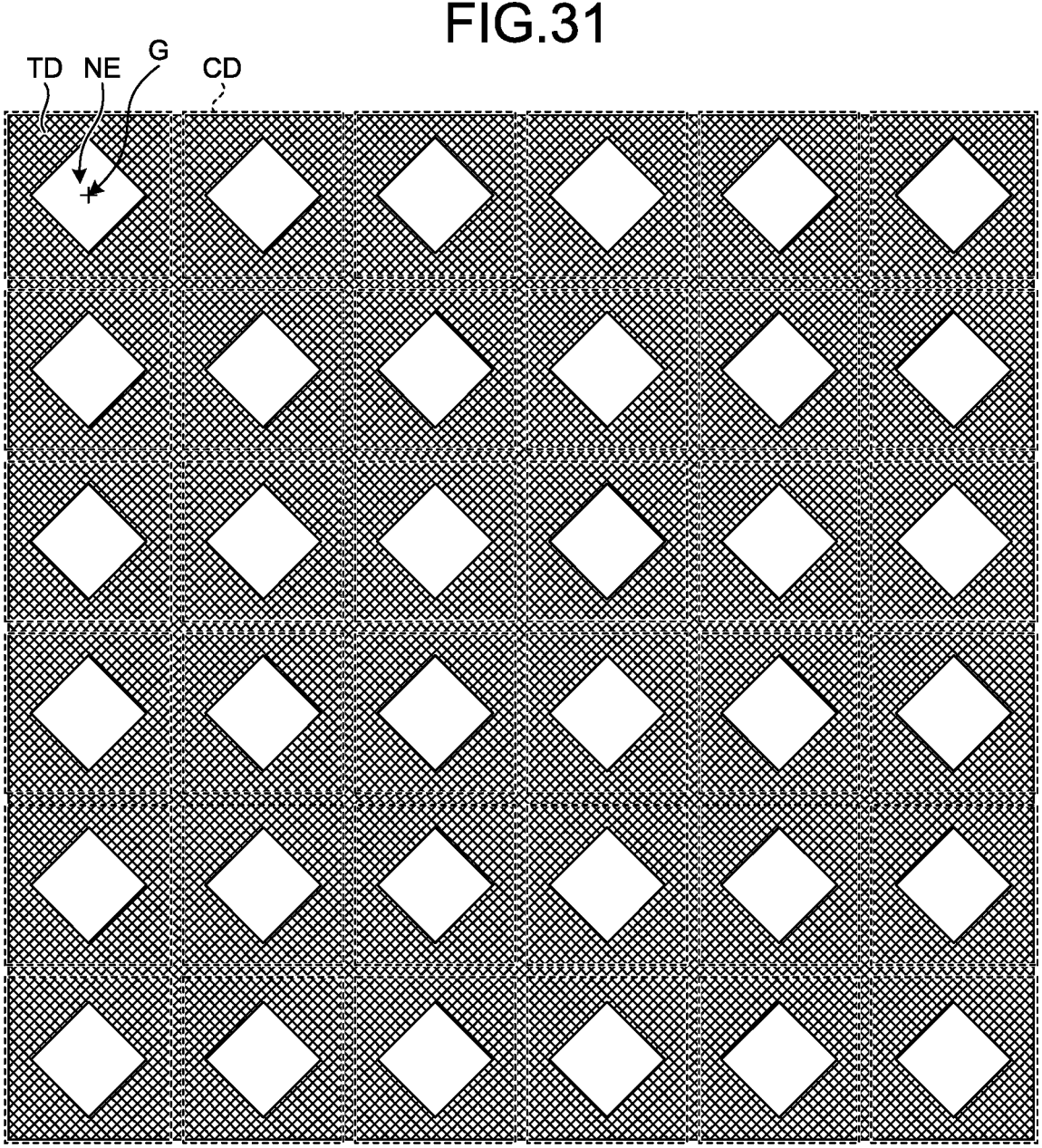
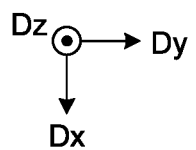

DETECTION DEVICE AND DISPLAY DEVICE

CROSS-REFERENCE TO RELATED APPLICATIONS

This application claims priority from Japanese Application No. 2018-248626, filed on Dec. 28, 2018, the contents of which are incorporated by reference herein in its entirety.

BACKGROUND

1. Technical Field

The present disclosure relates to a detection device and a display device.

2. Description of the Related Art

A touch detection device capable of detecting an external proximity object, or a so-called touch panel, has recently been attracting attention. As described in U.S. Unexamined Patent Application Publication No. 2014/0049486, 2013/0342498, and 2014/0049508, a touch panel is used as a display device by being mounted on or integrated with the display device, such as a liquid crystal display device. Various functions of such a display device are known, including a touch detection function to detect contact of a finger of an operator with a screen, and a hover detection (proximity detection) function to detect a proximity state, a gesture, or the like of the finger not in contact with the screen.

Touch detection and hover detection are significantly different in distance between detection electrodes and an object being detected serving as a detection target, such as a finger, and in sensitivity required for the detection. Consequently, if electrodes and a drive configuration for touch detection are used for hover detection without any change, desirable hover detection may be difficult. Increasing the area of the detection electrodes is an effective way to increase detection sensitivity in hover detection. In this case, however, detection accuracy in touch detection may decrease.

For the foregoing reasons, there is a need for a detection device and a display device that can desirably perform touch detection and hover detection.

SUMMARY

According to a first aspect of the present disclosure, a detection device includes: a plurality of first sensor electrodes disposed side by side in a first direction and a second direction intersecting the first direction; and a plurality of second sensor electrodes disposed side by side in the first direction and the second direction. One of the second sensor electrodes overlaps a plurality of first sensor electrodes out of the first sensor electrodes in planar view. Each of the second sensor electrodes has a plurality of electric-field transmission regions. One of the electric-field transmission regions overlaps a corresponding one of the first sensor electrodes in planar view and does not straddle two first sensor electrodes in planar view.

According to a second aspect of the present disclosure, a detection device includes: a plurality of first sensor electrodes disposed side by side in a first direction and a second direction intersecting the first direction; a plurality of second sensor electrodes disposed side by side in the first direction and the second direction; a drive circuit configured to supply a first drive signal to the first sensor electrodes and supply a second drive signal to the second sensor electrodes; and a control circuit having a first detection mode of detecting an object being detected in contact with a detection surface based on a first detection signal corresponding to a change in mutual capacitance between the first sensor electrodes and the second sensor electrodes when the first drive signal is supplied to the first sensor electrodes, and a second detection mode of detecting the object being detected in a non-contact state with respect to the detection surface based on a second detection signal corresponding to a change in self-capacitance in the second sensor electrodes when the second drive signal is supplied to the second sensor electrodes. One of the second sensor electrodes overlaps a plurality of first sensor electrodes out of the first sensor electrodes in planar view.

A display device according to the second aspect of the present disclosure includes the detection device and a display panel including a display region. The second sensor electrodes are provided in a region overlapping the display region.

A display device according to another aspect of the present disclosure includes a detection device and a display panel including a display region. The detection device includes a plurality of first sensor electrodes disposed side by side in a first direction and a second direction intersecting the first direction and a plurality of second sensor electrodes disposed side by side in the first direction and the second direction. One of the second sensor electrodes overlaps a plurality of first sensor electrodes out of the first sensor electrodes in planar view. The second sensor electrodes are provided in a region overlapping the display region.

BRIEF DESCRIPTION OF THE DRAWINGS

FIG. 31 is a view for explaining an example of arrangement of the second sensor electrodes according to a second embodiment;

DETAILED DESCRIPTION

Figure 1:
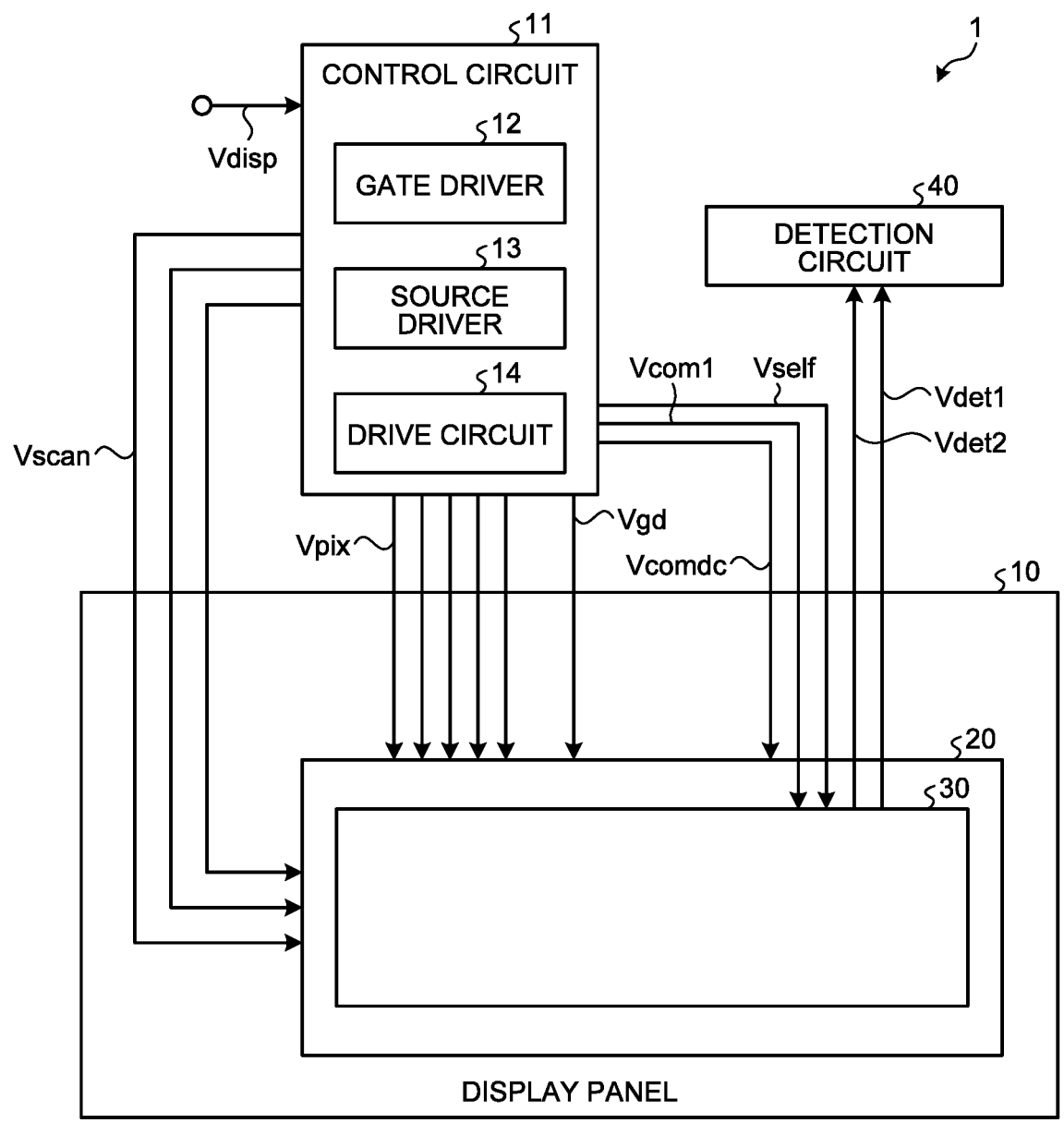
FIG. 1 is a block diagram illustrating an exemplary configuration of a display device according to a first embodiment.

Exemplary aspects (embodiments) to embody the present invention are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted. In this disclosure, when an element A is described as being "on" another element B, the element A can be directly on the other element B, or there can be one or more elements between the element A and the other element B.

First Embodiment

Figure 2:
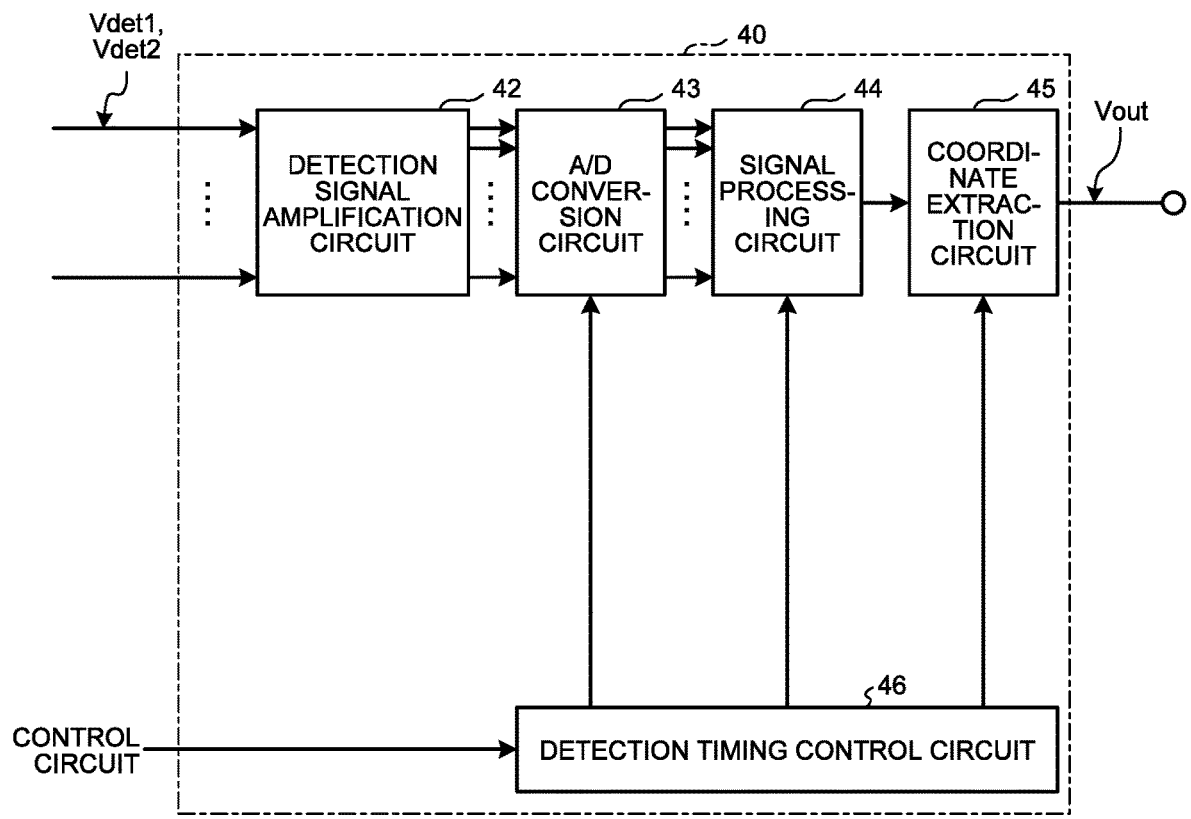
FIG. 2 is a block diagram illustrating an exemplary configuration of a detector.

FIG. 1 is a block diagram illustrating an exemplary configuration of a detection device and a display device according to a first embodiment of the present invention. FIG. 2 is a block diagram illustrating an exemplary configuration of a detection circuit. As illustrated in FIG. 1, a display device 1 includes a display panel 10, a control circuit 11, and a detection circuit 40. The display panel 10 includes: a display region 20 that displays an image; and a sensor region 30 included in the detection device that detects touch input. The block diagrams in FIGS. 1 and 2 conceptually illustrate the configuration, and the detection device and the display device may have another configuration.

The display panel 10 is a display device in which the display region 20 and the sensor region 30 are integrated. Specifically, in the display panel 10, part of members of the display region 20, such as electrodes and substrates, also serve as electrodes and substrates of the sensor region 30.

The display region 20 includes liquid crystal display elements serving as display elements. The display region 20 includes a plurality of pixels each having the display element and has a display surface facing the pixels. The display region 20 receives video signals to display an image composed of the pixels on the display surface. The display region 20 may be an organic electroluminescence (EL) display panel, for example.

The control circuit 11 includes a gate driver 12, a source driver 13, and a drive circuit 14. The control circuit 11 supplies control signals to the gate driver 12, the source driver 13, the drive circuit 14, and the detection circuit 40 based on video signals Vdisp supplied from the outside, thereby controlling a display operation and a detection operation.

The gate driver 12 supplies scanning signals Vscan to one horizontal line to be a target of display drive in the display panel 10 based on the control signals supplied from the control circuit 11. Consequently, one horizontal line to be a target of display drive is sequentially or simultaneously selected.

The source driver 13 is a circuit that supplies a pixel signal Vpix to each of sub-pixels SPix (refer to FIG. 14) in the display region 20. Part of the functions of the source driver 13 may be provided to the display panel 10. In this case, the control circuit 11 may generate the pixel signals Vpix and supply them to the source driver 13.

The drive circuit 14 supplies display drive signals Vcomdc to first sensor electrodes CD of the display panel 10. The drive circuit 14 supplies first drive signals Vcom1 for detection to the first sensor electrodes CD of the display panel 10 or supplies second drive signals Vself to second sensor electrodes TD.

The control circuit 11 according to the present embodiment time-divisionally performs a display mode of performing display in the display region 20 and a detection mode of detecting an object being detected in the sensor region 30. The control circuit 11 has two detection modes, that is, touch detection mode (first detection mode) and hover detection mode (second detection mode). In the present disclosure, touch detection is to detect the position of an object being detected in a state where the object being detected is in contact with a detection surface or the display surface or proximate enough to the detection surface or the display surface so as to be equated with the contact (hereinafter, referred to as a "contact state"). Hover detection is to detect the position and a movement of an object being detected in a state where the object being detected is neither in contact with the detection surface or the display surface nor proximate enough to the detection surface or the display surface so as to be equated with the contact (hereinafter, referred to as a "non-contact state"). A state where no object being detected is present at a position facing the detection surface or the display surface or a state where an object being detected is too far away from the display surface to be detected in hover detection is referred to as a "non-present state".

In the sensor region 30, the detection device performs touch detection based on the touch detection method by a mutual capacitance method (also referred to as a mutual method). If the detection device detects an object being detected in the contact state in the sensor region 30, the detection device outputs first detection signals Vdet1 to the detection circuit 40. In the sensor region 30, the detection device performs hover detection based on the touch detection method by a self-capacitance method (also referred to as a self-method). If the detection device detects an object being detected in the non-contact state in sensor region 30, the detection device outputs second detection signals Vdet2 to the detection circuit 40.

In mutual capacitance detection, the detection circuit 40 determines whether a touch is made by an object being detected on the display surface of the display panel 10 based on the control signals supplied from the control circuit 11 and on the first detection signals Vdet1 output from the display panel 10. If a touch is detected, the detection circuit 40 calculates, for example, coordinates at which the touch input is performed. In self-capacitance hover detection, the detection circuit 40 can detect the position and a movement, such as a gesture, of an object being detected in the non-contact state based on the control signals supplied from the control circuit 11 and on the second detection signals Vdet2 output from the display panel 10.

As illustrated in FIG. 2, the detection circuit 40 includes a detection signal amplification circuit 42, an analog/digital (A/D) conversion circuit 43, a signal processing circuit 44, a coordinate extraction circuit 45, and a detection timing control circuit 46. The detection timing control circuit 46 controls the A/D conversion circuit 43, the signal processing circuit 44, and the coordinate extraction circuit 45 such that they operate synchronously with one another based on the control signals supplied from the control circuit 11.

In touch detection, the detection signal amplification circuit 42 amplifies the first detection signals Vdet1 supplied from the display panel 10. The A/D conversion circuit 43 samples analog signals output from the detection signal amplification circuit 42 at a timing synchronized with the first drive signals Vcom1, thereby converting the analog signals into digital signals.

The signal processing circuit 44 is a logic circuit that determines whether a touch is made on the display panel 10 based on the output signals from the A/D conversion circuit 43. The signal processing circuit 44 performs processing of extracting a signal (absolute value $|\Delta V|$) of a difference between the detection signals caused by a finger. The signal processing circuit 44 compares the absolute value $|\Delta V|$ with a predetermined threshold voltage. If the absolute value $|\Delta V|$ is lower than the threshold voltage, the signal processing circuit 44 determines that an object being detected is in the non-present state. On the other hand, if the absolute value $|\Delta V|$ is equal to or higher than the threshold voltage, the signal processing circuit 44 determines that an object being detected is in the contact or proximity state (contact state). The detection circuit 40 thus can perform touch detection.

The coordinate extraction circuit 45 is a logic circuit that calculates, if the signal processing circuit 44 detects a touch, touch panel coordinates of the detection position. The coordinate extraction circuit 45 outputs the touch panel coordinates as output signals Vout. The coordinate extraction circuit 45 may output the output signals Vout to the control circuit 11. The control circuit 11 can perform a predetermined display or detection operation based on the output signals Vout.

In hover detection, the detection circuit 40 performs the same processing as that described above based on the second detection signals Vdet2 supplied from the display panel 10. If the signal processing circuit 44 detects an object being detected in the non-contact state, the coordinate extraction circuit 45 calculates the coordinates of the object being detected. The detection circuit 40 thus can detect the position and a movement, such as a gesture, of the object being detected in the non-contact state.

The detection signal amplification circuit 42, the A/D conversion circuit 43, the signal processing circuit 44, the coordinate extraction circuit 45, and the detection timing control circuit 46 of the detection circuit 40 are provided to the display device 1. The configuration is not limited thereto, and all or part of the functions of the detection circuit 40 may be provided to, for example, an external processor. The coordinate extraction circuit 45, for example, may be provided to the external processor different from the display device 1. In this case, the detection circuit 40 may output the signals processed by the signal processing circuit 44 as the output signals Vout.

Figure 3:
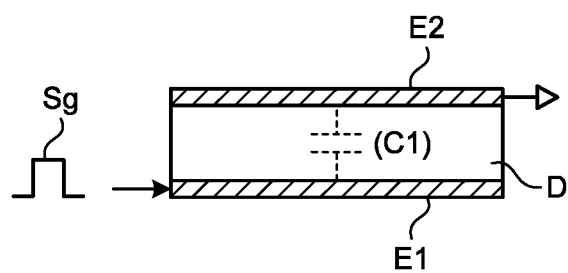
FIG. 3 is a diagram for explaining a mutual capacitance touch detection method and illustrates a state where no finger touches a detection electrode.
Figure 4:
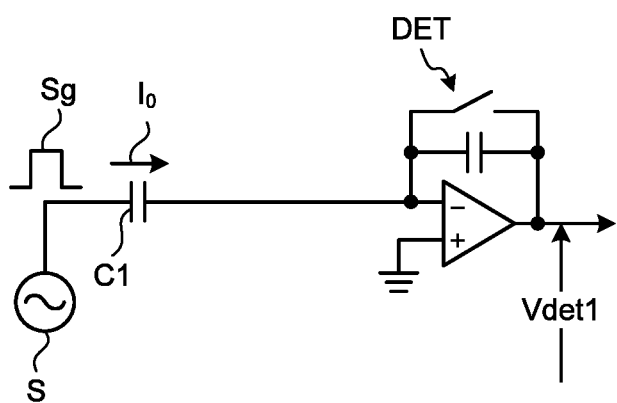
FIG. 4 is a diagram for explaining an example of an equivalent circuit in the state where no finger touches the detection electrode illustrated in FIG. 3.
Figure 5:
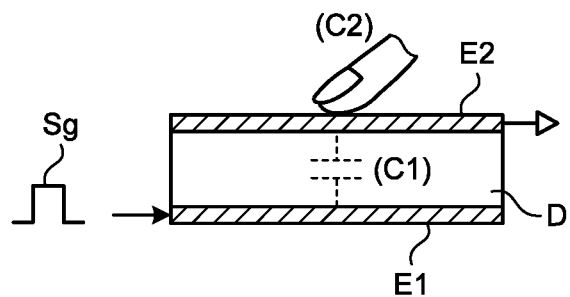
FIG. 5 is a diagram for explaining the mutual capacitance touch detection method and illustrates a state where a finger touches the detection electrode.
Figure 6:
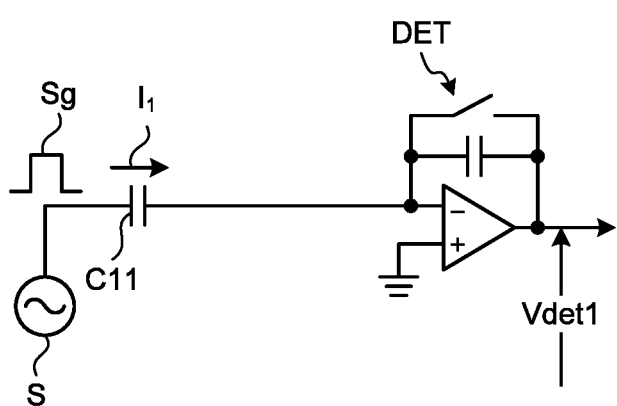
FIG. 6 is a diagram for explaining an example of the equivalent circuit in the state where the finger touches the detection electrode illustrated in FIG. 5.
Figure 7:
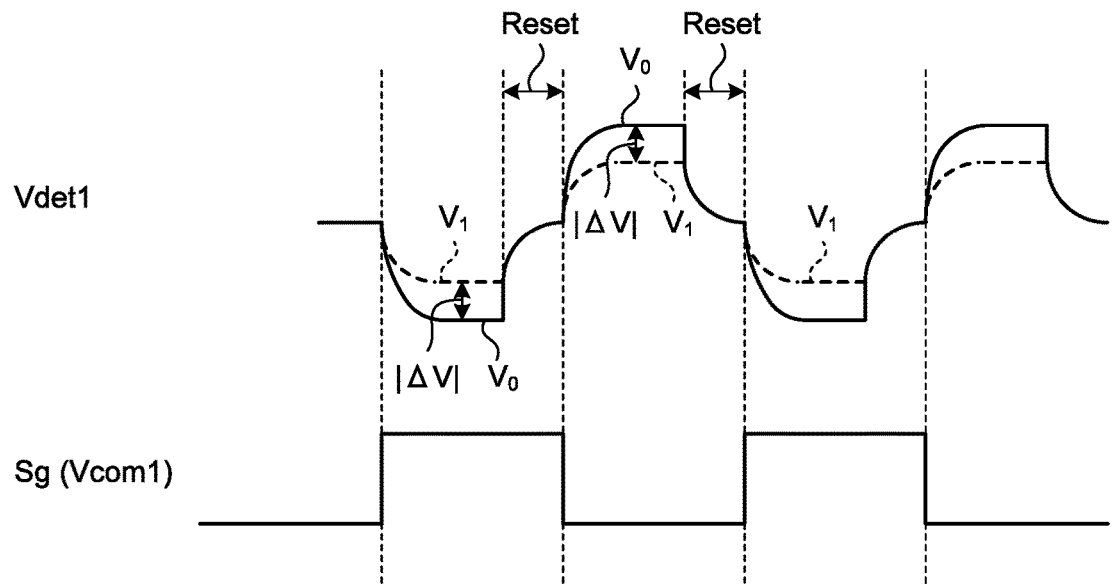
FIG. 7 is a diagram illustrating an example of waveforms of a drive signal and a detection signal in mutual capacitance touch detection.

The display panel 10 performs touch control based on the capacitance touch detection method. The following describes the touch detection method by the mutual capacitance method performed by the display device 1 according to the present embodiment with reference to FIGS. 3 to 7. FIG. 3 is a diagram for explaining the mutual capacitance detection method and illustrates the non-present state. FIG. 4 is a diagram for explaining an example of an equivalent circuit in mutual capacitance detection in the non-present state. FIG. 5 is a diagram for explaining the mutual capacitance detection method and illustrates the contact state. FIG. 6 is a diagram for explaining an example of the equivalent circuit in mutual capacitance detection in the contact state. FIG. 7 is a diagram illustrating an example of waveforms of a drive signal and a detection signal in mutual capacitance detection. While the following describes a case where a finger is in contact with or in proximity to a detection electrode, the object being detected is not limited to a finger and may be an object including a conductor, such as a stylus.

As illustrated in FIG. 3, a capacitance element C1 includes a pair of electrodes, that is, a first sensor electrode E1 and a detection electrode E2 facing each other with a dielectric D interposed therebetween. The capacitance element C1 generates fringe lines of electric force extending from the ends of the first sensor electrode E1 to the upper surface of the detection electrode E2 besides lines of electric force (not illustrated) formed between the facing surfaces of the first sensor electrode E1 and the detection electrode E2. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection signal amplification circuit 42 illustrated in FIG. 2, for example.

When the AC signal source S applies an AC rectangular wave Sg at a predetermined frequency (e.g., a frequency of the order of several kilohertz to several hundred kilohertz) to the first sensor electrode E1 (first end of the capacitance element C1), an output waveform (the first detection signals Vdet1) illustrated in FIG. 7 appears via the voltage detector DET. The AC rectangular wave Sg corresponds to the first drive signal Vcom1 received from the drive circuit 14.

As illustrated in FIGS. 3 and 4, in the non-present state, an electric current $I_0$ corresponding to the capacitance value of the capacitance element C1 flows. The voltage detector DET illustrated in FIG. 4 converts fluctuations in the electric current depending on the AC rectangular wave Sg into fluctuations in the voltage (waveform $V_0$ indicated by the solid line (refer to FIG. 7)).

As illustrated in FIGS. 5 and 6, in the contact state, capacitance C2 formed by a finger is in contact with the detection electrode E2 or proximate enough to the detection electrode E2 so as to be equated with the contact. The fringe lines of electric force between the first sensor electrode E1 and the detection electrode E2 are blocked by the conductor (finger). As a result, the capacitance element C1 acts as a capacitance element C11 having a capacitance value smaller than that in the non-present state. As illustrated in FIGS. 5 and 6, the voltage detector DET converts fluctuations in an electric current $I_1$ depending on the AC rectangular wave Sg into fluctuations in the voltage (waveform $V_1$ indicated by the dotted line (refer to FIG. 7)).

In this case, the waveform $V_1$ has amplitude smaller than that of the waveform $V_0$. The absolute value $|\Delta V|$ of the voltage difference between the waveform $V_0$ and the waveform $V_1$ varies according to the effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset described above, the voltage detector DET accurately detects the absolute value $|\Delta V|$ of the voltage difference.

As described above, the detection circuit 40 compares the absolute value $|\Delta V|$ with the predetermined threshold voltage, thereby determining whether an external proximity object is in the non-present state or in the contact or proximity state. The detection circuit 40 thus can perform touch detection based on the mutual capacitance detection method.

Figure 8:
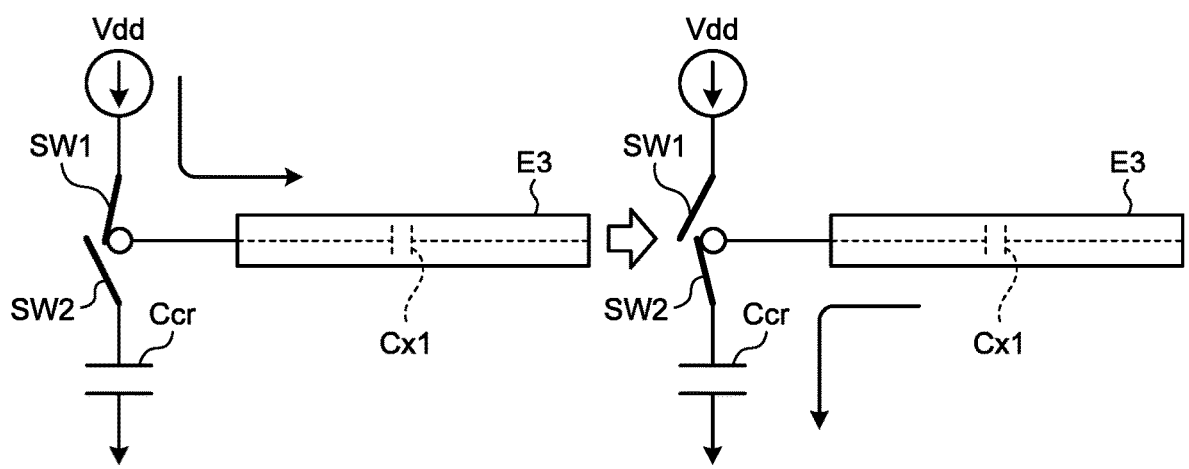
FIG. 8 is a diagram for explaining a self-capacitance touch detection method and illustrates a state where no finger touches a detection electrode.
Figure 9:
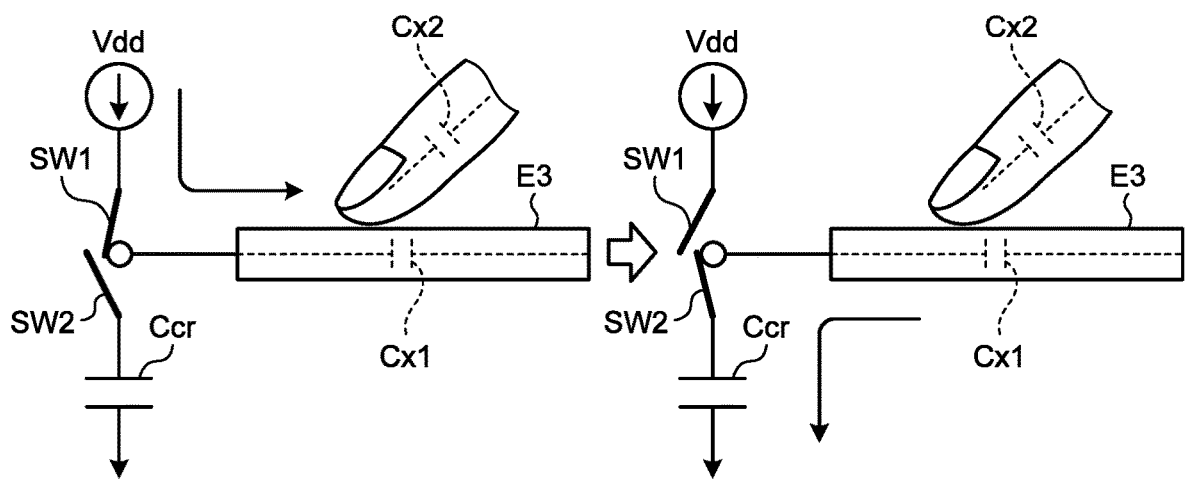
FIG. 9 is a diagram for explaining the self-capacitance touch detection method and illustrates a state where a finger touches the detection electrode.
Figure 10:
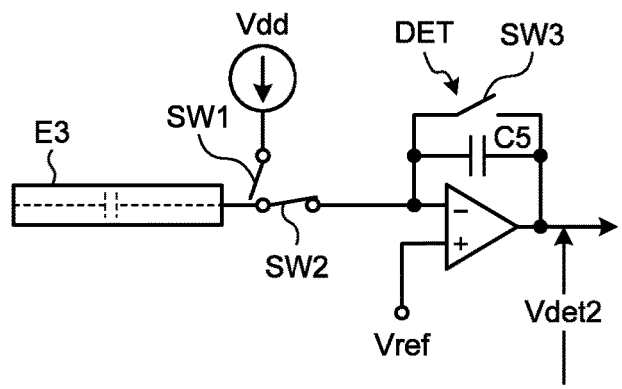
FIG. 10 is a diagram for explaining an example of an equivalent circuit in self-capacitance touch detection.
Figure 11:
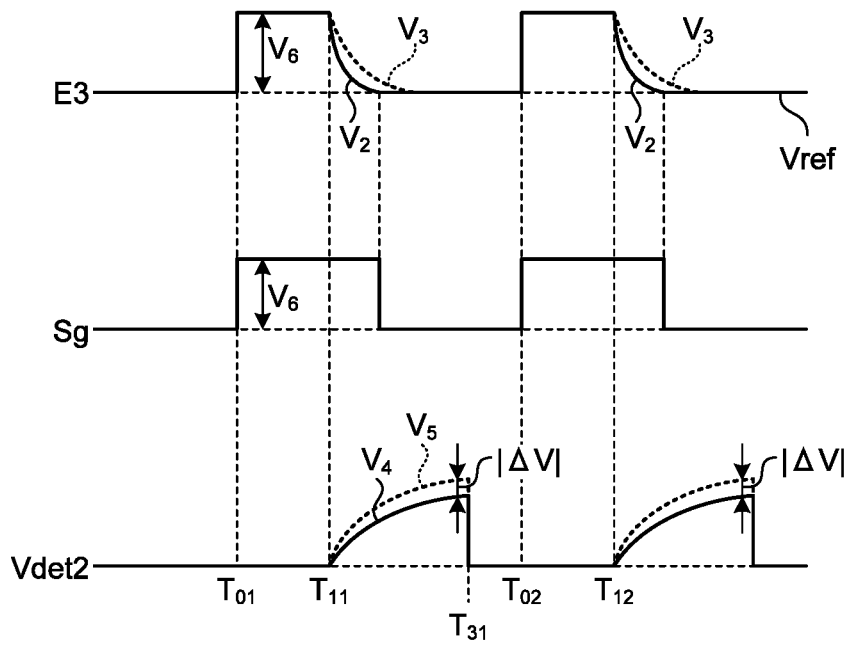
FIG. 11 is a diagram illustrating an example of waveforms of a drive signal and a detection signal in self-capacitance touch detection.

The following describes the self-capacitance detection method with reference to FIGS. 8 to 11. FIG. 8 is a diagram for explaining the self-capacitance detection method and illustrates the non-present state. FIG. 9 is a diagram for explaining the self-capacitance detection method and illustrates the contact state. FIG. 10 is a diagram for explaining an example of an equivalent circuit in self-capacitance detection. FIG. 11 is a diagram illustrating an example of waveforms of a drive signal and a detection signal in self-capacitance detection.

In the left figure in FIG. 8, the detection electrode E3 is coupled to a power source Vdd by a switch SW1 but is not coupled to a capacitor Ccr by a switch SW2 in the non-present state. In this state, capacitance Cx1 of the detection electrode E3 is charged. In the right figure in FIG. 8, coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

In the left figure in FIG. 9, the detection electrode E3 is coupled to the power source Vdd by the switch SW1 but is not coupled to the capacitor Ccr by the switch SW2 in the contact state. In this state, capacitance Cx2 generated by a finger in proximity to the detection electrode E3 is also charged besides the capacitance Cx1 of the detection electrode E3. In the right figure in FIG. 9, coupling between the power source Vdd and the detection electrode E3 is cut off by the switch SW1, and the detection electrode E3 is coupled to the capacitor Ccr by the switch SW2. In this state, electric charges in the capacitance Cx1 and the capacitance Cx2 are discharged via the capacitor Ccr.

Because of the capacitance Cx2, the voltage change characteristics of the capacitor Ccr in discharging (contact state) illustrated in the right figure of FIG. 9 are obviously different from those of the capacitor Ccr in discharging (non-present state) illustrated in the right figure of FIG. 8. The self-capacitance method determines whether an input operation is performed by a finger or the like using a difference in voltage change characteristics of the capacitor Ccr according to the presence of the capacitance Cx2.

Specifically, an AC rectangular wave Sg (refer to FIG. 11) at a predetermined frequency (e.g., a frequency of the order of several kilohertz to several hundred kilohertz) is applied to the detection electrode E3. The voltage detector DET illustrated in FIG. 10 converts fluctuations in the electric current depending on the AC rectangular wave Sg into fluctuations in the voltage (waveforms $V_4$ and $V_5$ (refer to FIG. 7)).

As illustrated in FIG. 11, the voltage level of the AC rectangular wave Sg rises to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at $V_6$ by the capacitance Cx1 (or Cx1+Cx2, refer to FIG. 9) of the detection electrode E3. The voltage detector DET performs a reset operation before time $T_{11}$. The reset operation makes the output voltage substantially equal to Vref.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the second detection signal Vdet2 in FIG. 11). In the non-present state, the output (second detection signal Vdet2) from the voltage detector DET corresponds to a waveform V2 indicated by the solid line, and Vdet2=Cx1×$V_6$/C5 is satisfied. In the contact state, the output corresponds to a waveform V3 indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. Subsequently, time $T_{01}$ and time $T_{12}$ follow, and the operation described above is repeated at a predetermined frequency (e.g., a frequency of the order of several kilohertz to several hundred kilohertz). The detection circuit 40 thus can perform touch detection method based on the self-capacitance detection method.

Figure 12:
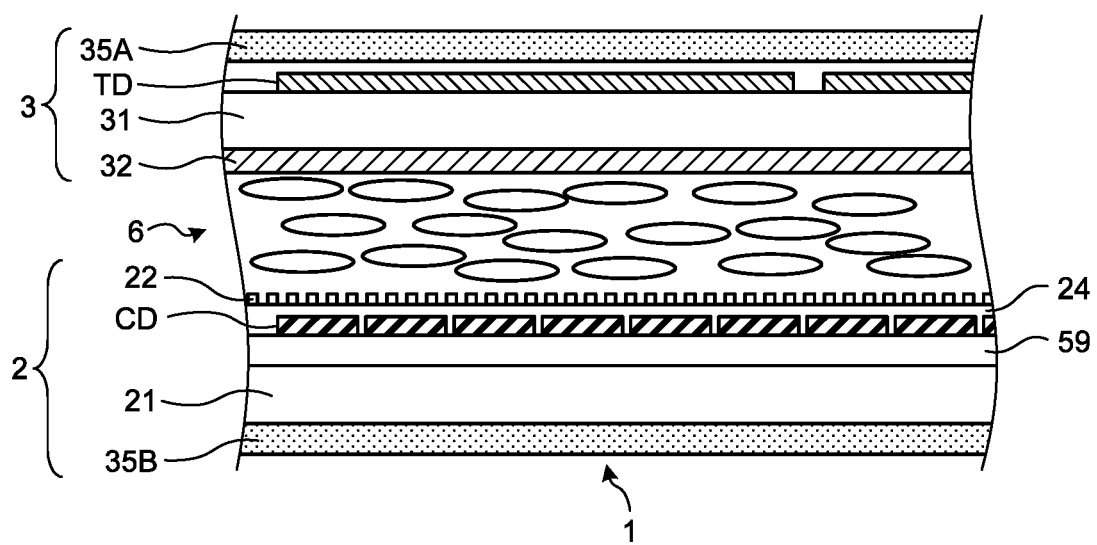
FIG. 12 is a sectional view illustrating an exemplary configuration of a display panel.
Figure 13:
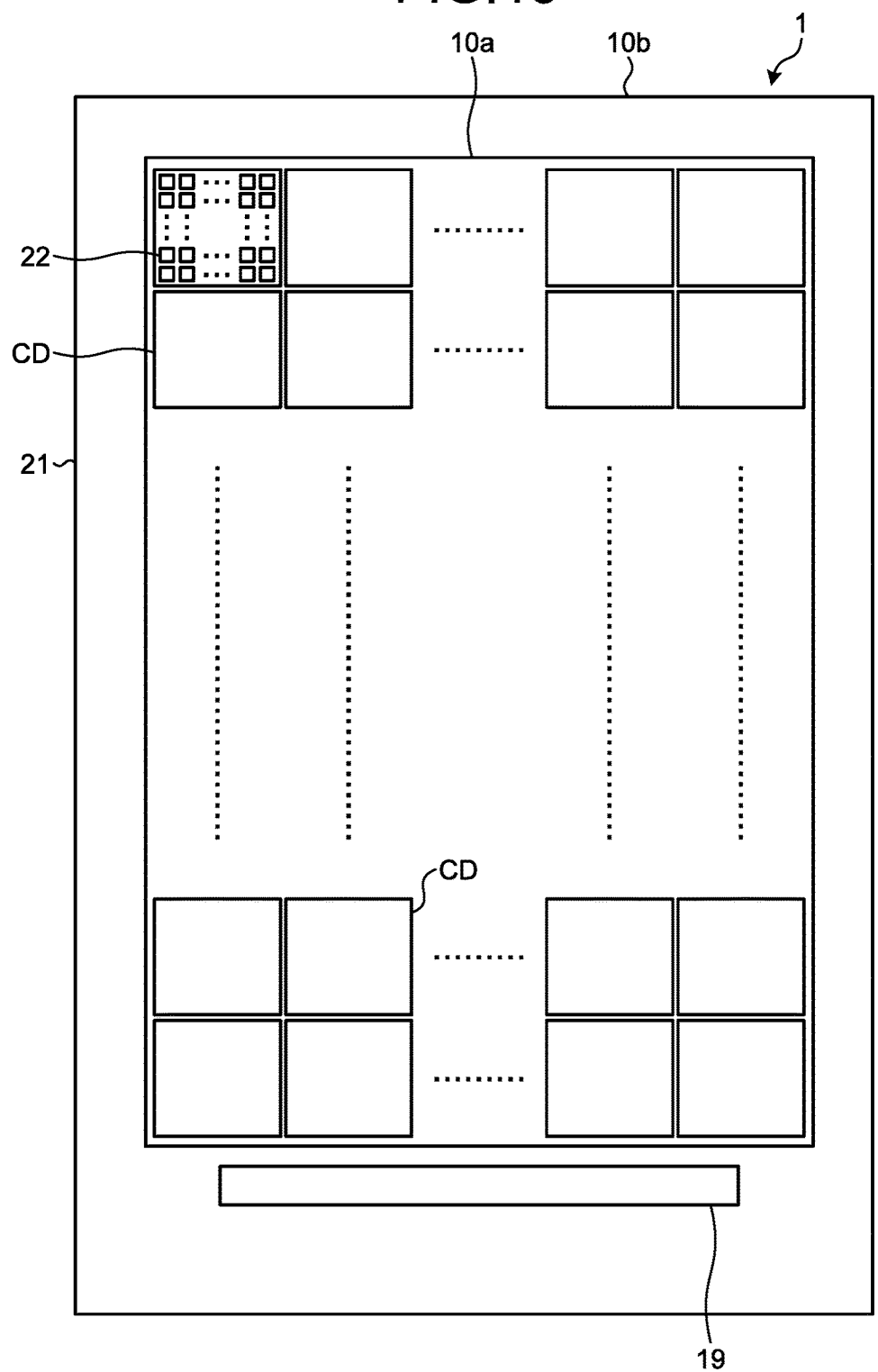
FIG. 13 is a plan view schematically illustrating a TFT substrate constituting the display device.

The following describes an exemplary configuration of the display device 1 in greater detail. FIG. 12 is a sectional view illustrating an exemplary configuration of the display panel. FIG. 13 is a plan view schematically illustrating a TFT substrate constituting the display device. As illustrated in FIG. 12, the display panel 10 includes: a thin-film transistor (TFT) substrate 2 serving as a circuit substrate; a counter substrate 3 facing the TFT substrate 2 in a direction perpendicular to the surface of the TFT substrate 2; and a liquid crystal layer 6 disposed between the TFT substrate 2 and the counter substrate 3.

As illustrated in FIG. 12, the TFT substrate 2 includes: a first substrate 21; a plurality of pixel electrodes 22 provided in a matrix (row-column configuration) above the first substrate 21; a plurality of first sensor electrodes CD provided between the first substrate 21 and the pixel electrodes 22; and an insulating layer 24 insulating the pixel electrodes 22 from the first sensor electrodes CD. A polarizing plate 35B is provided under the first substrate 21 with an adhesive layer (not illustrated) interposed therebetween. In the present specification, an "upper side" indicates a side in a direction from the TFT substrate 2 toward a second substrate 31 in the direction perpendicular to the first substrate 21, and a "lower side" indicates a side in a direction from the second substrate 31 toward the TFT substrate 2.

As illustrated in FIG. 13, the first substrate 21 has an active area 10a and a peripheral region 10b. The active area 10a is an area on which an image is displayed. The peripheral region 10b is provided around the active area 10a. The active area 10a has a rectangular shape having a pair of long sides and a pair of short sides. The peripheral region 10b has a frame shape surrounding the four sides of the active area 10a.

A first direction Dx according to the present embodiment extends along the long side of the active area 10a. A second direction Dy is orthogonal to the first direction Dx. The directions Dx and Dy are not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21.

The first sensor electrodes CD are provided in the active area 10a of the first substrate 21 and arrayed in a matrix (row-column configuration) in directions along the long side and the short side of the active area 10a. The first sensor electrodes CD are made of a translucent conductive material, such as indium tin oxide (ITO). A plurality of pixel electrodes 22 are disposed in a matrix (row-column configuration) at positions corresponding to one first sensor electrode CD. The pixel electrode 22 has an area smaller than that of the first sensor electrode CD. While the first sensor electrodes CD and the pixel electrodes 22 are partially illustrated in FIG. 13, the first sensor electrodes CD and the pixel electrodes 22 are disposed across the whole region of the active area 10a. In the present specification, the row direction is also referred to as an X-direction, and the column direction is also referred to as a Y-direction. The X-direction is a first direction, and the Y-direction is a second direction.

The peripheral region 10b of the first substrate 21 is provided with a display integrated circuit (IC) 19. The display IC 19 is a chip mounted on the first substrate 21 by a chip-on-glass (COG) technique. The control circuit 11 illustrated in FIG. 1 is, for example, built into the display IC 19. The display IC 19 is coupled to data lines SGL (refer to FIG. 14) and gate lines GCL (refer to FIG. 14). The display IC 19 is also coupled to the first sensor electrodes CD via a coupling switching circuit 17 (refer to FIG. 23), which will be described later, for example. The display IC 19 outputs control signals to the gate lines GCL and the data lines SGL, which will be described later, based on the video signals Vdisp (refer to FIG. 1) supplied from an external host IC (not illustrated). In the present embodiment, at least part of the control circuit 11 may be incorporated in a second IC other than the display IC 19. The second IC may be a chip mounted on the first substrate 21 by the COG technique or a chip mounted on a flexible substrate coupled to the first substrate 21.

As illustrated in FIG. 13, the display IC 19 may be disposed on the short side of the peripheral region 10b, for example. With this configuration, the display IC 19 need not be provided on the long side of the peripheral region 10b, thereby reducing the width of the long side of the peripheral region 10b.

As illustrated in FIG. 12, the counter substrate 3 includes: the second substrate 31; and a color filter 32 provided on one surface of the second substrate 31. The other surface of the second substrate 31 is provided with a plurality of second sensor electrodes TD of the sensor 30 (refer to FIG. 1). A polarizing plate 35A is provided on the second sensor electrodes TD with an adhesive layer (not illustrated) interposed therebetween. A flexible substrate 71 (refer to FIG. 18) is coupled to the second substrate 31. The flexible substrate 71 is coupled to the second sensor electrodes TD via wiring.

As illustrated in FIG. 12, the TFT substrate 2 and the counter substrate 3 face each other with a predetermined gap interposed therebetween. The space between the TFT substrate 2 and the counter substrate 3 is provided with the liquid crystal layer 6 serving as a display functional layer. The liquid crystal layer 6 modulates light passing therethrough depending on the state of an electric field. The liquid crystal layer 6 employs, for example, liquid crystals in a lateral electric-field mode, such as the in-plane switching (IPS) mode including the fringe field switching (FFS) mode. Orientation films, which will be described later, are provided in contact with the liquid crystal layer 6 illustrated in FIG. 12.

Figure 14:
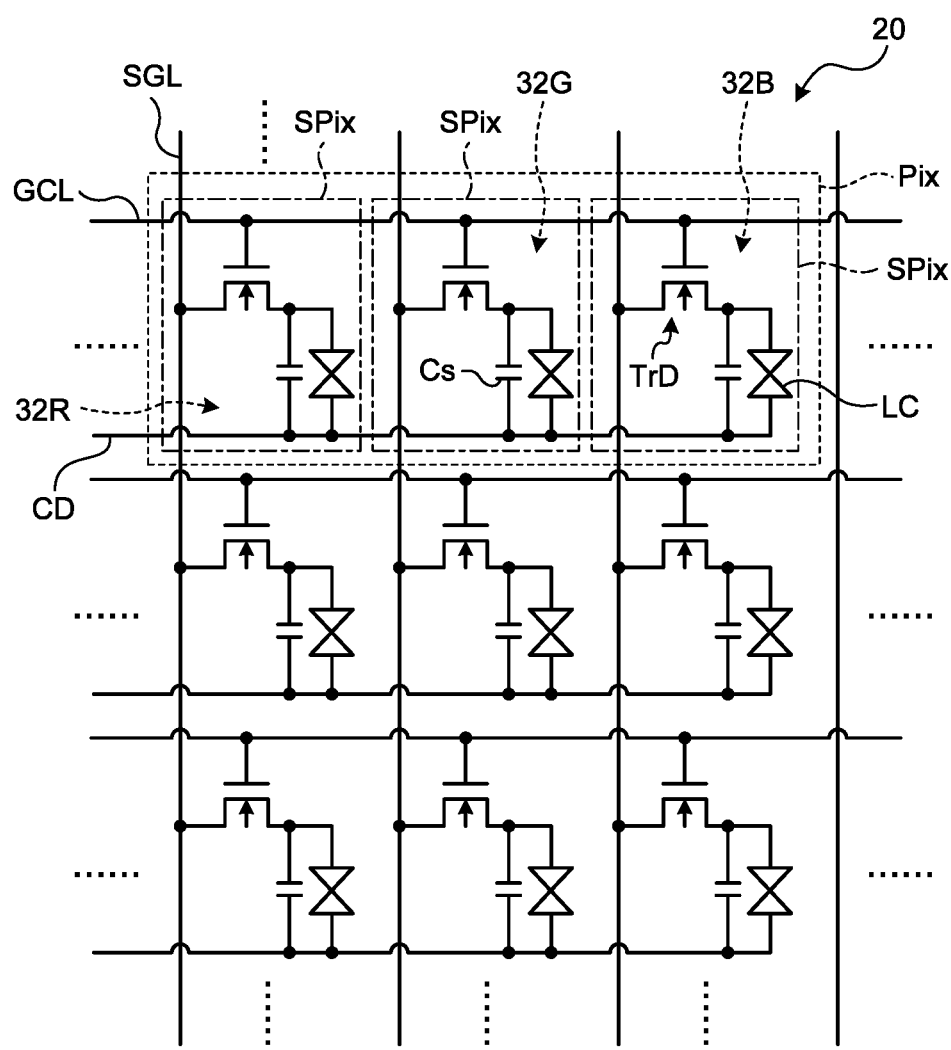
FIG. 14 is a circuit diagram illustrating a pixel array in a display device according to the first embodiment.
Figure 15:
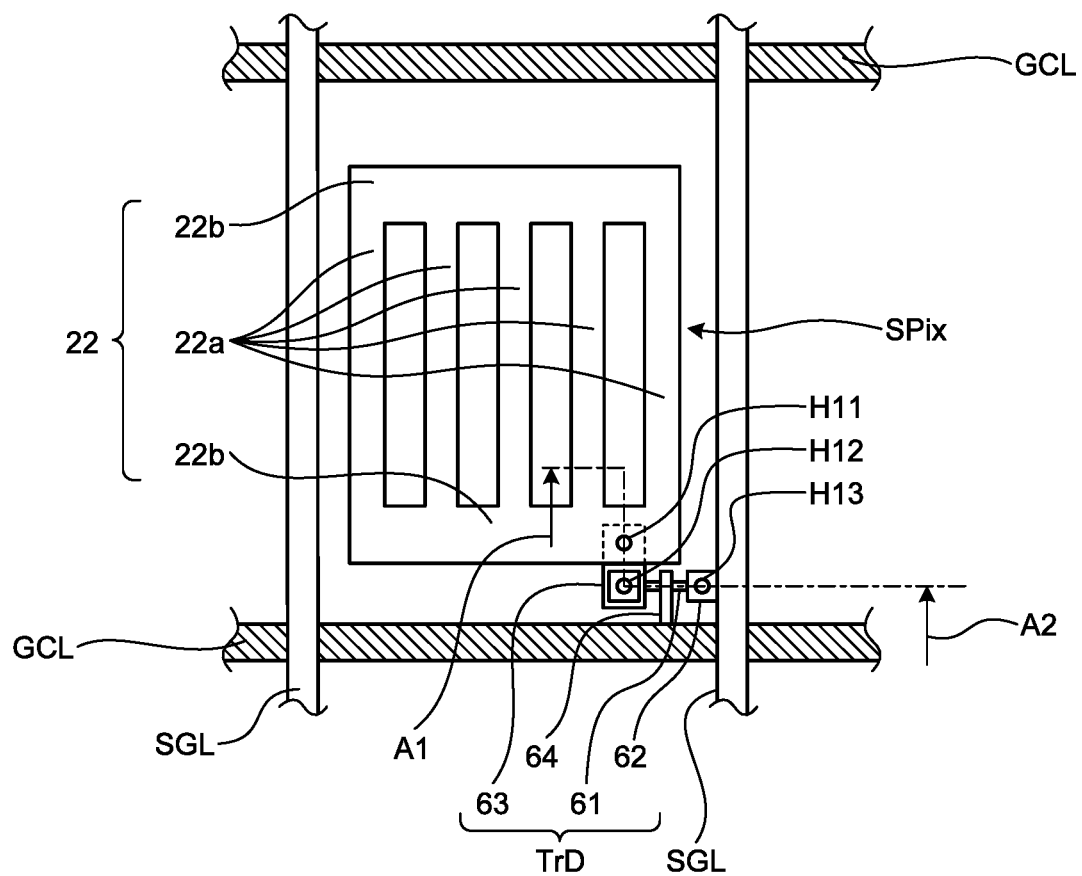
FIG. 15 is a plan view illustrating an exemplary configuration of a sub-pixel.
Figure 16:
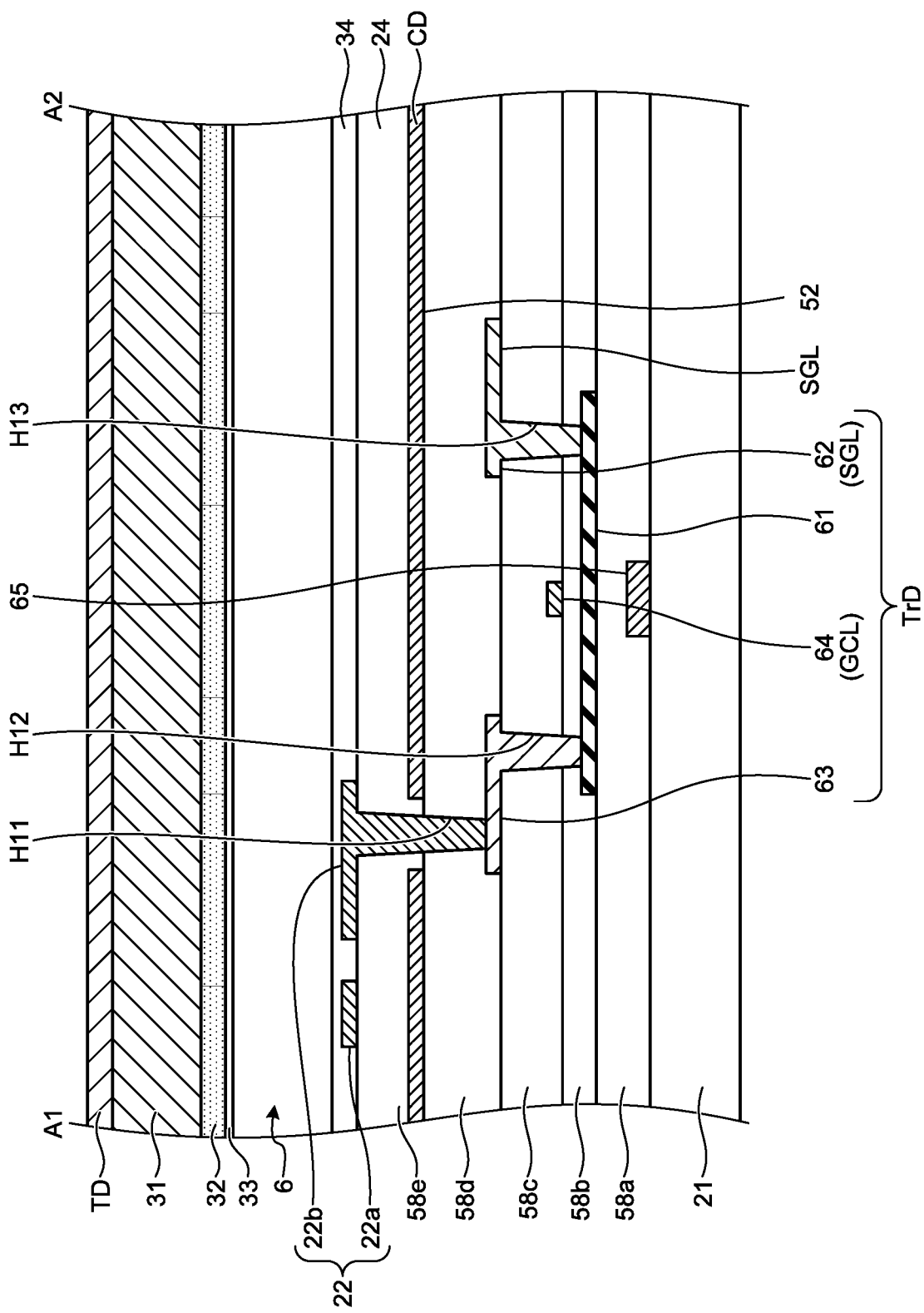
FIG. 16 is a sectional view along line A1-A2 of FIG. 15.

FIG. 14 is a circuit diagram illustrating a pixel array in the display device according to the first embodiment. FIG. 15 is a plan view illustrating an exemplary configuration of a sub-pixel. FIG. 16 is a sectional view along line A1-A2 of FIG. 15. The first substrate 21 illustrated in FIG. 12 is provided with switching elements TrD of respective sub-pixels SPix and wiring, such as the data lines SGL and the gate lines GCL, as illustrated in FIG. 14. The data lines SGL supply the pixel signals Vpix to the pixel electrodes 22, and the gate lines GCL supply drive signals for driving the switching elements TrD. The data lines SGL and the gate lines GCL extend on a plane parallel to the surface of the first substrate 21.

The display region 20 illustrated in FIG. 14 includes a plurality of sub-pixels SPix arrayed in a matrix (row-column configuration). The sub-pixels SPix each include the switching element TrD and a liquid crystal element LC. The switching element TrD is a thin-film transistor and is an n-channel metal oxide semiconductor (MOS) TFT in this example. The source of the switching element TrD is coupled to the data line SGL, the gate thereof is coupled to the gate line GCL, and the drain thereof is coupled to one end of the liquid crystal element LC. The other end of the liquid crystal element LC is coupled to the first sensor electrode CD. The insulating layer 24 (refer to FIG. 11) is provided between the pixel electrodes 22 and the first sensor electrodes CD to form holding capacitance Cs illustrated in FIG. 14.

The sub-pixel SPix is coupled to the other sub-pixels SPix belonging to the same row in the display region 20 by the gate line GCL. The gate lines GCL are coupled to the gate driver 12 (refer to FIG. 1) and supplied with the scanning signals Vscan from the gate driver 12. The sub-pixel SPix is coupled to the other sub-pixels SPix belonging to the same column in the display region 20 by the data line SGL. The data lines SGL are coupled to the source driver 13 (refer to FIG. 1) and supplied with the pixel signals Vpix from the source driver 13. The first sensor electrodes CD are coupled to the drive circuit 14 (refer to FIG. 1) and supplied with the display drive signals Vcomdc or the detection drive signals Vcom from the drive circuit 14.

As illustrated in FIG. 15, the region surrounded by the gate lines GCL and the data lines SGL corresponds to one sub-pixel SPix. The sub-pixel SPix includes a region in which the pixel electrode 22 overlaps the first sensor electrode CD. A plurality of pixel electrodes 22 are coupled to the data line SGL via the respective switching elements TrD.

As illustrated in FIG. 15, the pixel electrode 22 includes a plurality of strip electrodes 22a and connections 22b. The strip electrodes 22a extend along the data lines SGL and are arrayed in a direction along the gate lines GCL. The connections 22b each connect the ends of the strip electrodes 22a. While the pixel electrode 22 includes five strip electrodes 22a, the present disclosure is not limited thereto, and the pixel electrode 22 may include four or less or six or more strip electrodes 22a. The pixel electrode 22 may include two strip electrodes 22a, for example.

As illustrated in FIG. 15, the switching element TrD includes a semiconductor layer 61, a source electrode 62, a drain electrode 63, and a gate electrode 64. A light-shielding layer 65 is provided under the semiconductor layer 61. Light traveling from a backlight to the semiconductor layer 61, for example, is blocked by the light-shielding layer 65.

As illustrated in FIG. 16, the light-shielding layer 65 is provided on the first substrate 21. An insulating layer 58a is provided on the first substrate 21 so as to cover the light-shielding layer 65. The semiconductor layer 61 is provided on the insulating layer 58a. The gate electrode 64 (gate line GCL) is provided on the semiconductor layer 61 with an insulating layer 58b interposed therebetween. The drain electrode 63 and the source electrode 62 (data line SGL) are provided above the gate electrode 64 (gate line GCL) with an insulating layer 58c interposed therebetween. The first sensor electrode CD is provided above the drain electrode 63 and the source electrode 62 (data line SGL) with an insulating layer 58d interposed therebetween. As described above, the pixel electrode 22 is provided above the first sensor electrode CD with an insulating layer 58e interposed therebetween. An orientation film 34 is provided on the pixel electrode 22. An orientation film 33 is provided on the opposite side of the orientation film 34 across the liquid crystal layer 6.

As illustrated in FIGS. 15 and 16, the pixel electrode 22 is coupled to the drain electrode 63 of the switching element TrD through a contact hole H11. The semiconductor layer 61 is coupled to the drain electrode 63 through a contact hole H12. The semiconductor layer 61 intersects the gate electrode 64 in planar view. In the present specification, the planar view indicates a view seen from the thickness direction (Z-direction) of the display panel 10. The gate electrode 64 is coupled to the gate line GCL and protrudes from one side of the gate line GCL. The semiconductor layer 61 extends to a position overlapping the source electrode 62 and is electrically coupled to the source electrode 62 through a contact hole H13. The source electrode 62 is coupled to the data line SGL and protrudes from one side of the data line SGL.

The gate driver 12 (refer to FIG. 1) drives to sequentially scan the gate lines GCL. The gate driver 12 applies the scanning signals Vscan (refer to FIG. 1) to the gates of the TFT elements Tr of the respective sub-pixels SPix via the gate line GCL. The gate driver 12 thus sequentially selects one row (one horizontal line) out of the sub-pixels SPix as a target of display drive. The source driver 13 supplies the pixel signals Vpix to the sub-pixels SPix belonging to one horizontal line selected by the gate driver 12 via the data lines SGL illustrated in FIG. 14. The sub-pixels SPix perform display in units of one horizontal line in accordance with the supplied pixel signals Vpix. To perform the display operation, the drive circuit 14 applies the display drive signals Vcomdc to the first sensor electrodes CD. As a result, the first sensor electrodes CD serve as common electrodes that supply a common potential (reference potential) to a plurality of pixel electrodes 22 of the display region 20.

The first sensor electrodes CD according to the present embodiment also serve as drive electrodes when the sensor 30 performs mutual capacitance touch detection.

The color filter 32 includes periodically arrayed color areas, for example, in three colors of red (R), green (G), and blue (B). Color areas 32R, 32G, and 32B in the three colors of R, G, and B, respectively, serve as a set and are allocated to the respective sub-pixels SPix. The set of the sub-pixels SPix corresponding to the respective color areas 32R, 32G, and 32B in the three colors serves as one pixel Pix. The color filter 32 faces the liquid crystal layer 6 in the direction perpendicular to the first substrate 21. The color filter 32 may be a combination of other colors as long as they are colored in respective different colors. The color filter 32 is not limited to a combination of three colors and may be a combination of four or more colors.

The display device 1 performs a detection operation (detection operation period) and a display operation (display operation period) in a time-division manner, for example. The display device 1 may perform the detection operation and the display operation in any divided manner. The following describes a method by which the display device 1 performs the detection operation and the display operation by dividing them into a plurality of sections in one frame period (1F) of the display region 20, that is, in a time required to display video information of one screen.

Figure 17:
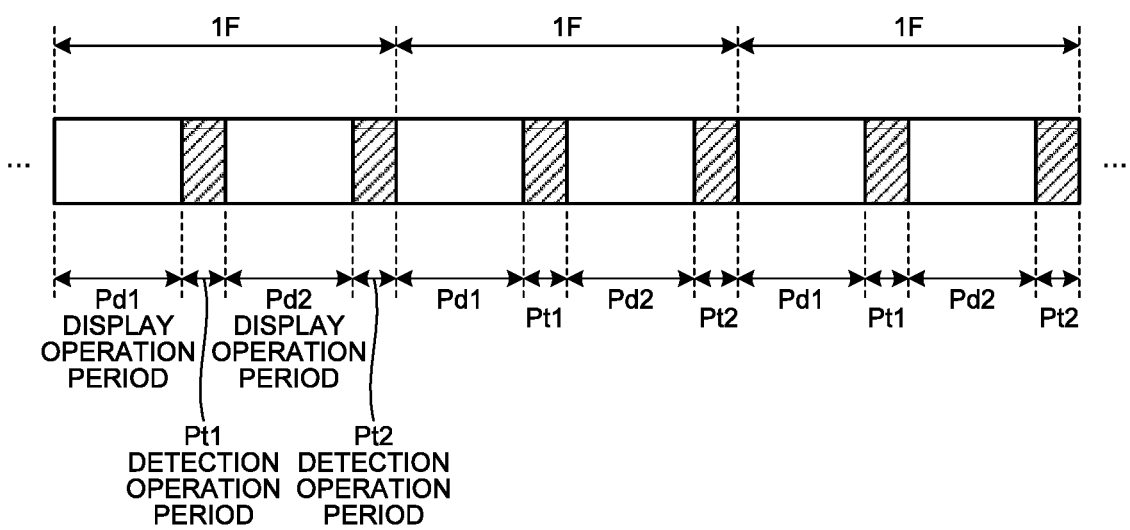
FIG. 17 is a diagram schematically illustrating an example of arrangement of display operation periods and detection operation periods in one frame period.

FIG. 17 is a diagram schematically illustrating an example of arrangement of the display operation periods and the detection operation periods in one frame period. One frame period (1F) includes two display operation periods Pd1 and Pd2 and two detection operation periods Pt1 and Pt2. These periods are alternately arranged on the time axis in the order of the display operation period Pd1, the detection operation period Pt1, the display operation period Pd2, and the detection operation period Pt2, for example.

The control circuit 11 (refer to FIG. 1) supplies the pixel signals Vpix to the pixels Pix (refer to FIG. 14) in a plurality of rows selected in the display operation periods Pd1 and Pd2 via the gate driver 12 and the source driver 13. In the display operation periods Pd1 and Pd2, the control circuit 11 supplies the display drive signals Vcomdc serving as a common electrode potential for display to the selected first sensor electrodes CD via the drive circuit 14.

The detection operation periods Pt1 and Pt2 each include a touch detection period and a hover detection period. The touch detection period is a period for performing touch detection based on changes in mutual capacitance between the second sensor electrodes TD and the first sensor electrodes CD. The hover detection period is a period for performing hover detection based on changes in self-capacitance in the second sensor electrodes TD. In the touch detection periods, the control circuit 11 (refer to FIG. 1) supplies the detection drive signals Vcom to the first sensor electrodes CD selected in the touch detection periods via the drive circuit 14. The detection circuit 40 determines whether a touch is made and calculates the coordinates of a touch input position based on the detection signals Vdet1 supplied from the second sensor electrodes TD. In the hover detection period, the control circuit 11 supplies the detection drive signals Vcom to the second sensor electrodes TD via the drive circuit 14. The detection circuit 40 determines whether hover is performed and calculates the coordinates of a hover input position based on the detection signals Vdet2 supplied from the second sensor electrodes TD.

As illustrated in FIG. 17, the display device 1 displays video of one screen by dividing it into two sections in one frame period (1F). The display device 1 may divide the display operation period in one frame period (1F) into more sections. The display device 1 may also divide the detection operation period in one frame period (1F) into more sections.

The display device 1 may perform detection for half of one screen or one screen in each of the detection operation periods Pt1 and Pt2. Alternatively, the display device 1 may perform skipping detection or the like as necessary in the detection operation periods Pt1 and Pt2. Still alternatively, the display device 1 may perform the display operation and the detection operation once in one frame period (1F) without dividing them into a plurality of sections.

In the detection operation periods Pt1 and Pt2, the display device 1 may bring the gate lines GCL and the data lines SGL (refer to FIG. 14) into a state of being neither supplied with any voltage signal nor electrically coupled to any component (Hi-Z: high impedance). Alternatively, the display device 1 may supply the gate lines GCL and the data lines SGL with guard signals Vgd having the same waveform as that of the detection drive signals Vcom and synchronized with the drive signals Vcom. This configuration can prevent generation of capacitance between the first sensor electrodes CD supplied with the detection drive signals Vcom and the gate lines GCL and the data lines SGL in the detection operation periods Pt1 and Pt2. Consequently, this configuration can increase the detection sensitivity.

Figure 18:
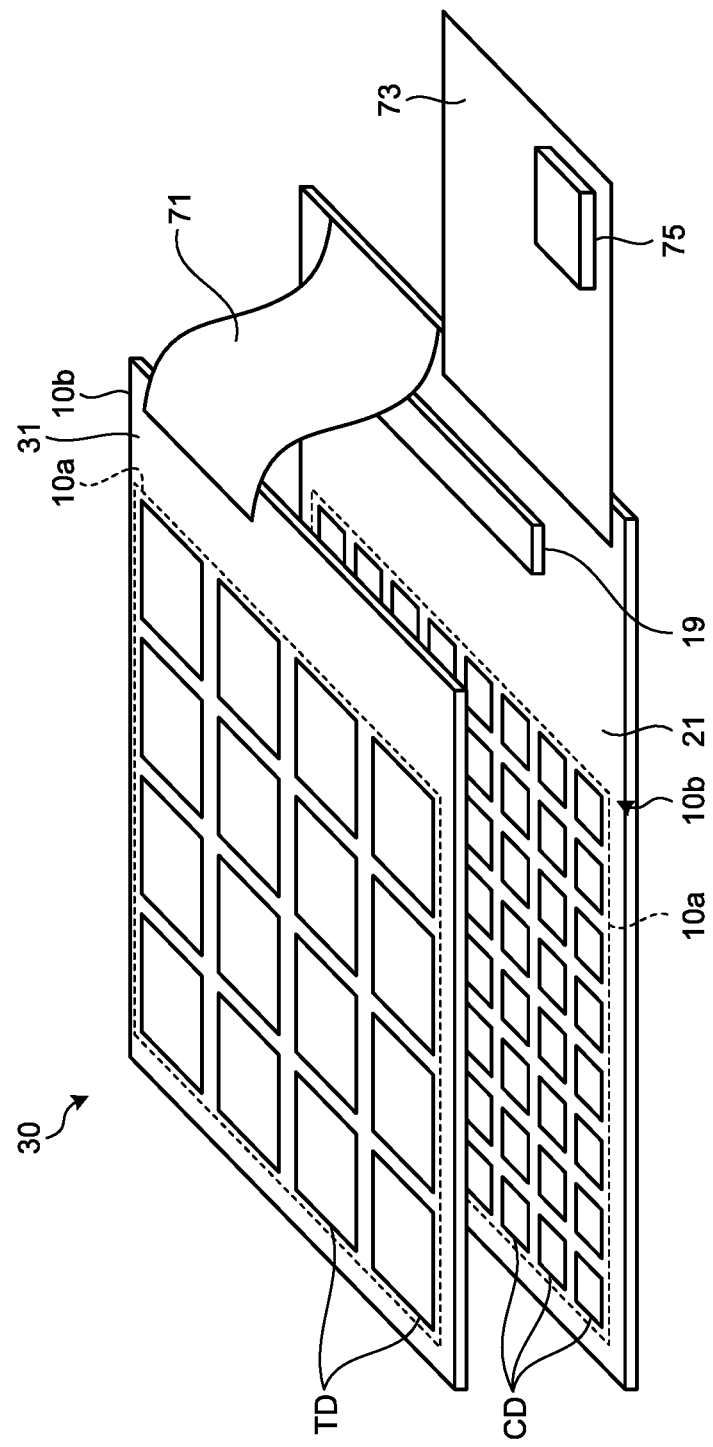
FIG. 18 is a perspective view illustrating an exemplary configuration of first sensor electrodes and second sensor electrodes in the display panel according to the first embodiment.

FIG. 18 is a perspective view illustrating an exemplary configuration of the first sensor electrodes and the second sensor electrodes in the display panel according to the first embodiment. As illustrated in FIG. 18, the sensor 30 includes the first sensor electrodes CD and the second sensor electrodes TD. The first sensor electrodes CD are provided to the first substrate 21. The second sensor electrodes TD are provided to the second substrate 31. Both the first sensor electrodes CD and the second sensor electrodes TD are provided in the active area 10*a*. The peripheral region 10*b* of the first substrate 21 is provided with the display IC 19.

Figure 19:
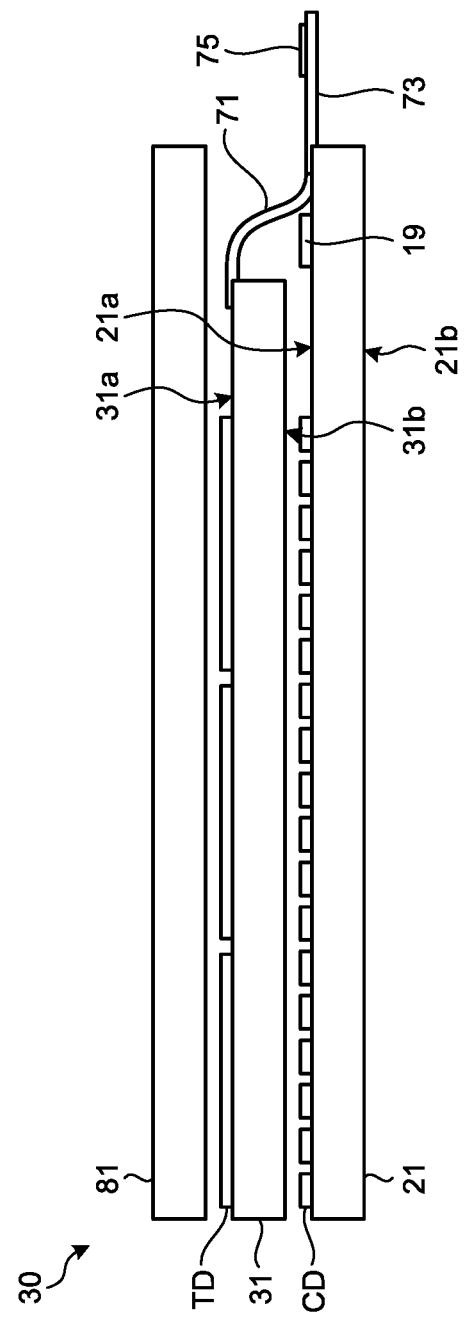
FIG. 19 is a side view of the display panel illustrated in FIG. 18.

FIG. 19 is a side view of the display panel illustrated in FIG. 18. The first substrate 21, for example, has a first surface 21*a* and a second surface 21*b* on the opposite side of the first surface 21*a*. The second substrate 31 has a first surface 31*a* and a second surface 31*b* on the opposite side of the first surface 31*a*. The first surface 21*a* of the first substrate 21 faces the second surface 31*b* of the second substrate 31. The first sensor electrodes CD are provided on the first surface 21*a* of the first substrate 21. The second sensor electrodes TD are provided on the second surface 31*b* of the second substrate 31.

A cover glass 81 is provided on the first surface 31*a* of the second substrate 31 to protect the sensor 30.

The first sensor electrode CD has, for example, a quadrangular shape in planar view. The second sensor electrode TD also has, for example, a quadrangular shape in planar view. Examples of the quadrangular shape include, but are not limited to, a square shape and a rectangular shape. The second sensor electrode TD is larger than the first sensor electrode CD in planar view. One second sensor electrode TD, for example, overlaps a plurality of first sensor electrodes CD in planar view.

One end of the flexible substrate 71 is coupled to the peripheral region 10*b* of the first substrate 21, and the other end thereof is coupled to the peripheral region 10*b* of the second substrate 31. One end of a flexible substrate 73 is coupled to the peripheral region 10*b* of the first substrate 21. As illustrated in FIGS. 18 and 19, the flexible substrate 73 is provided with, for example, a detection IC 75 that incorporates the detection circuit 40 (refer to FIG. 1). The second sensor electrodes TD are coupled to input terminals of the detection signal amplification circuit 42 (refer to FIG. 2) of the detection circuit 40 via wiring provided to the flexible substrates 71 and 73. The first sensor electrodes CD are coupled to input terminals of the detection signal amplification circuit 42 of the detection circuit 40 via wiring provided to the flexible substrate 73.

The display IC 19 may be provided on the flexible substrate 73. The display IC 19 and the detection IC 75 may be integrated as one IC.

Figure 20:
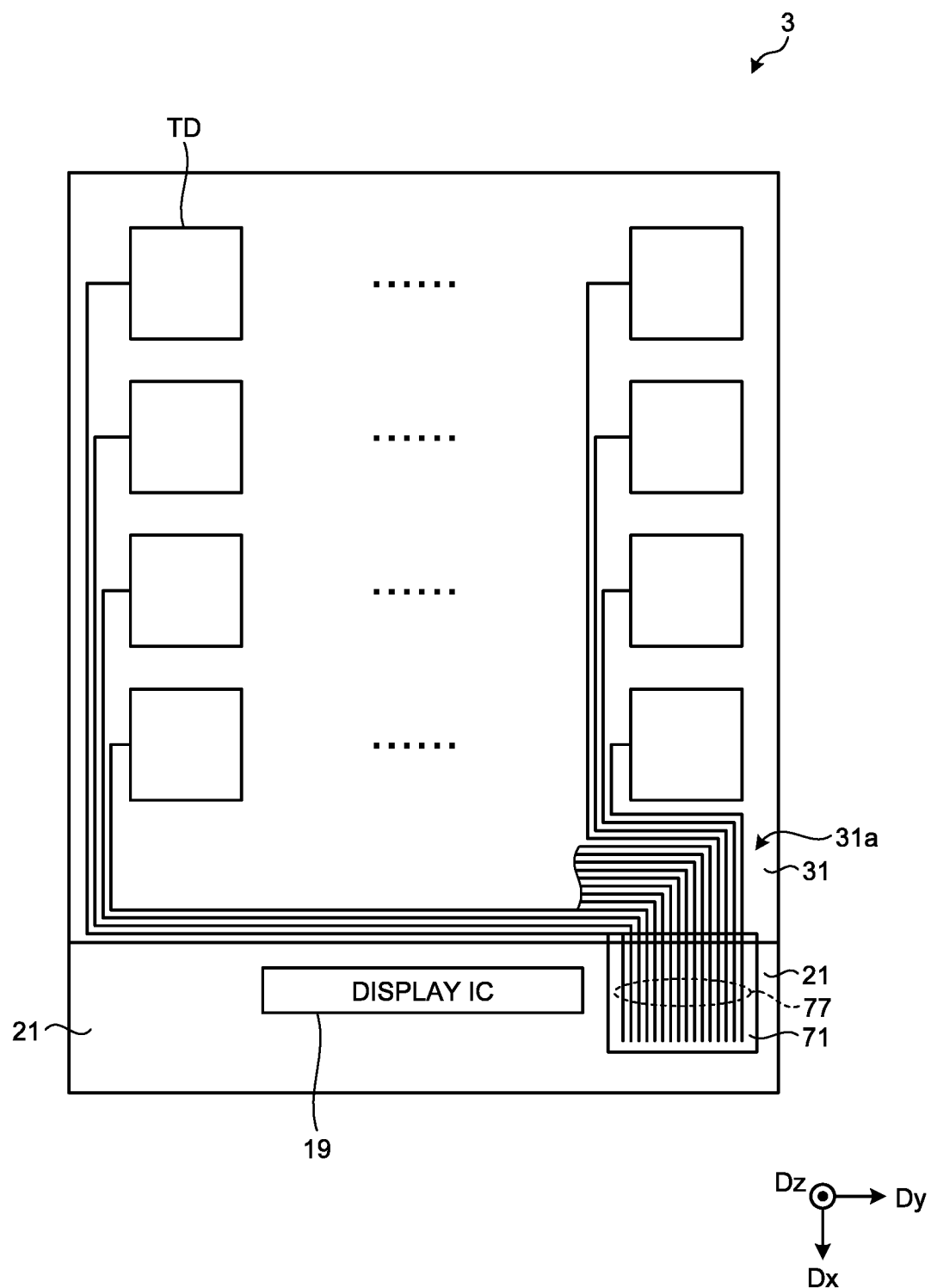
FIG. 20 is a plan view illustrating an example of arrangement of the second sensor electrodes in a counter substrate.

The following describes an exemplary configuration of the TFT substrate 2 and the counter substrate 3 in greater detail. FIG. 20 is a plan view illustrating an example of arrangement of the second sensor electrodes in the counter substrate. As illustrated in FIG. 20, the counter substrate 3 is provided with the second sensor electrodes TD. The second sensor electrodes TD have the same shape and the same size. The second sensor electrodes TD are arrayed at regular intervals in the row direction and the column direction. The number of second sensor electrodes TD is not limited to the number illustrated in FIG. 20, and only needs to be plural.

The counter substrate 3 includes a plurality of wires 77 provided on the first surface 31a of the second substrate 31. The wires 77 are each coupled to any one of the second sensor electrodes TD and extend from the active area 10a (refer to FIG. 18) to the peripheral region 10b (refer to FIG. 18).

The second sensor electrodes TD are made of a translucent conductive material, such as ITO. The wires 77 may be metal thin wires made of a metal material, for example, and be electrically coupled to the respective second sensor electrodes TD. The second sensor electrodes TD are not necessarily made of ITO and may be metal thin wires made of a metal material, for example. In this case, the second sensor electrodes TD and the wires 77 may be a conductive layer produced simultaneously by the same process, for example, and be provided in the same layer.

The wires 77 are coupled to the TFT substrate 2 via the flexible substrate 71. The wires 77 of the flexible substrate 71 are made of a conductive material, such as copper.

Figure 21:
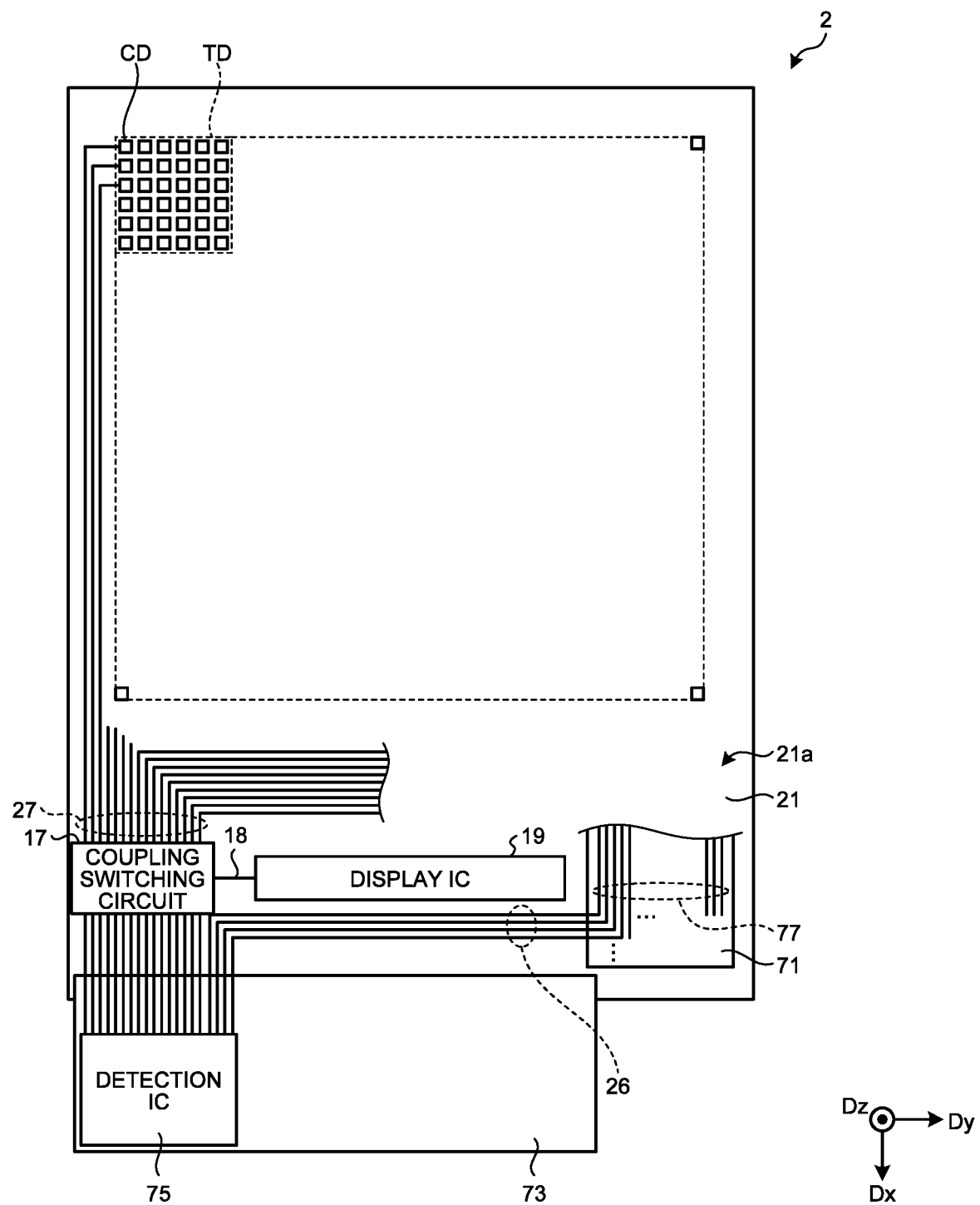
FIG. 21 is a plan view illustrating an example of arrangement of the first sensor electrodes in the TFT substrate.

FIG. 21 is a plan view illustrating an example of arrangement of the first sensor electrodes in the TFT substrate. As illustrated in FIG. 21, the TFT substrate 2 is provided with the first sensor electrodes CD. The first sensor electrodes CD each have a square shape or a rectangular shape, for example. The first sensor electrodes CD are arrayed at regular intervals in the row direction and the column direction.

The TFT substrate 2 includes a plurality of wires 27 provided on the first surface 21a of the first substrate 21. The wires 27 are each coupled to any one of the first sensor electrodes CD and extend from the active area 10a (refer to FIG. 18) to the peripheral region 10b (refer to FIG. 18).

The first sensor electrodes CD and the wires 27 are made of a translucent conductive material, such as ITO. The first sensor electrodes CD and the wires 27 are a conductive layer produced simultaneously by the same process, for example, and are provided in the same layer. The wires 27 may be metal wires embedded in an insulating layer below the first sensor electrodes CD.

As illustrated in FIG. 21, the TFT substrate 2 includes a plurality of wires 26 provided on the first surface 21a of the first substrate 21. As illustrated in FIGS. 20 and 21, the wires 26 on the first surface 21a of the first substrate 21 are coupled to the respective second sensor electrodes TD illustrated in FIG. 20 via the respective wires 77 (refer to FIG. 20) provided to the flexible substrate 71.

The wires 26 are made of a conductive material. The wires 26 are provided in the peripheral region 10b (refer to FIG. 18) of the first substrate 21, for example. The wires 26 may be provided to the flexible substrate 73.

As illustrated in FIG. 21, the wires 26 are coupled to the detection IC 75 via the flexible substrate 73. The TFT substrate 2, for example, includes: the coupling switching circuit 17 provided to the first substrate 21; and a wire 18 provided to the first substrate 21 to couple the coupling switching circuit 17 to the display IC 19. The wires 27 are coupled to the display IC 19 or the detection IC 75 by the coupling switching circuit 17. The coupling switching circuit 17 may be incorporated in the display IC 19, the detection IC 75, or another IC (not illustrated) mounted on the first substrate 21 or the flexible substrate 73. An exemplary internal configuration of the coupling switching circuit 17 will be described later with reference to FIG. 24.

As illustrated in FIG. 21, a plurality of first sensor electrodes CD are disposed overlapping one second sensor electrode TD. For example, 36 first sensor electrodes CD are disposed at positions overlapping one second sensor electrode TD in planar view.

Figure 22A:
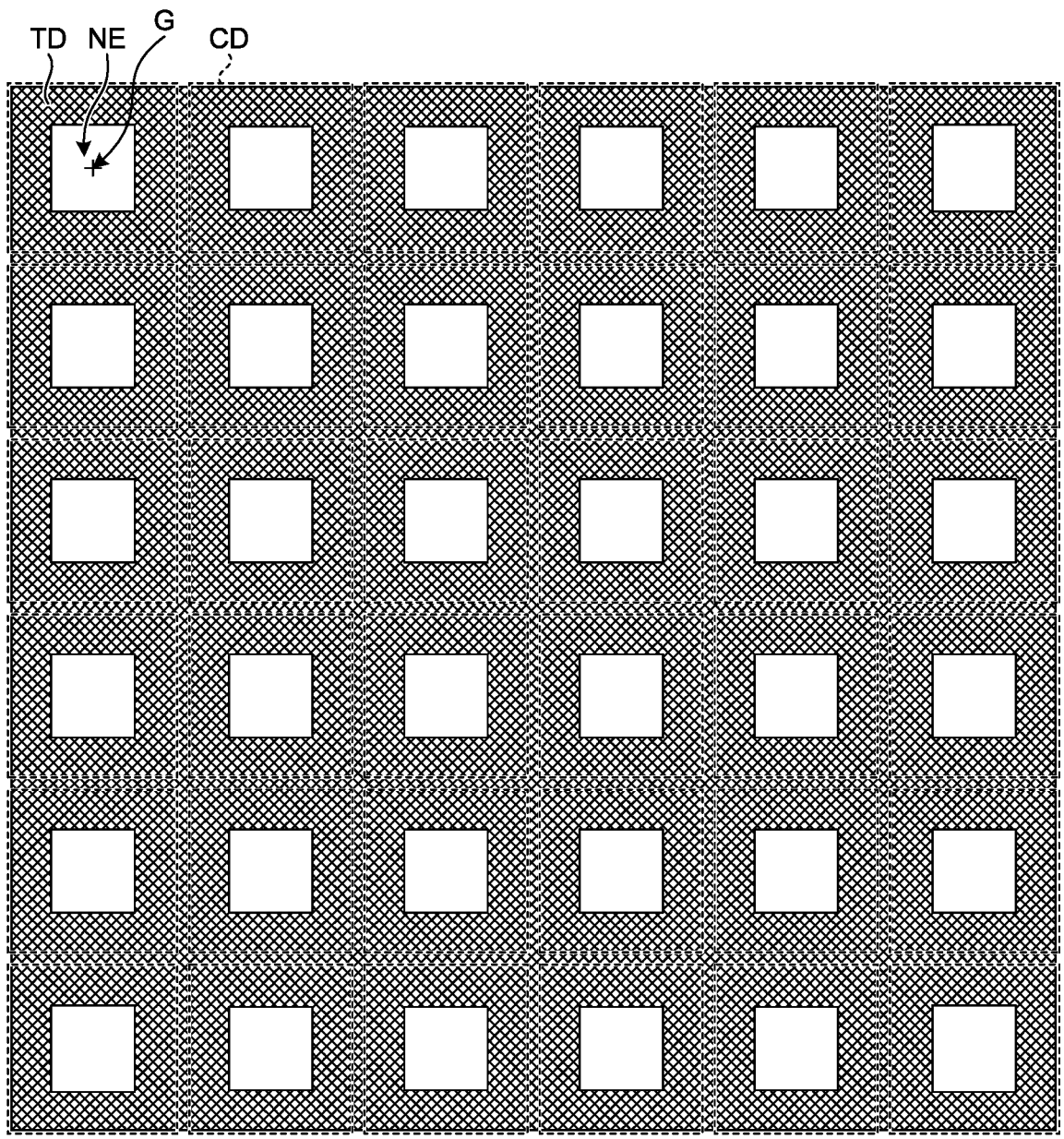
FIG. 22A is a view for explaining an example of arrangement of the second sensor electrodes.

FIG. 22A is a view for explaining an example of arrangement of the second sensor electrodes. As illustrated in FIG. 22A, the second sensor electrodes TD each have electric-field transmission regions NE inside thereof. In the example illustrated in FIG. 22A, one second sensor electrode TD has 36 electric-field transmission regions NE. The electric-field transmission region NE is a region where an electric potential of a conductor present around the electric-field transmission region NE is not fixed or where no conductor is present.

Figure 22B:
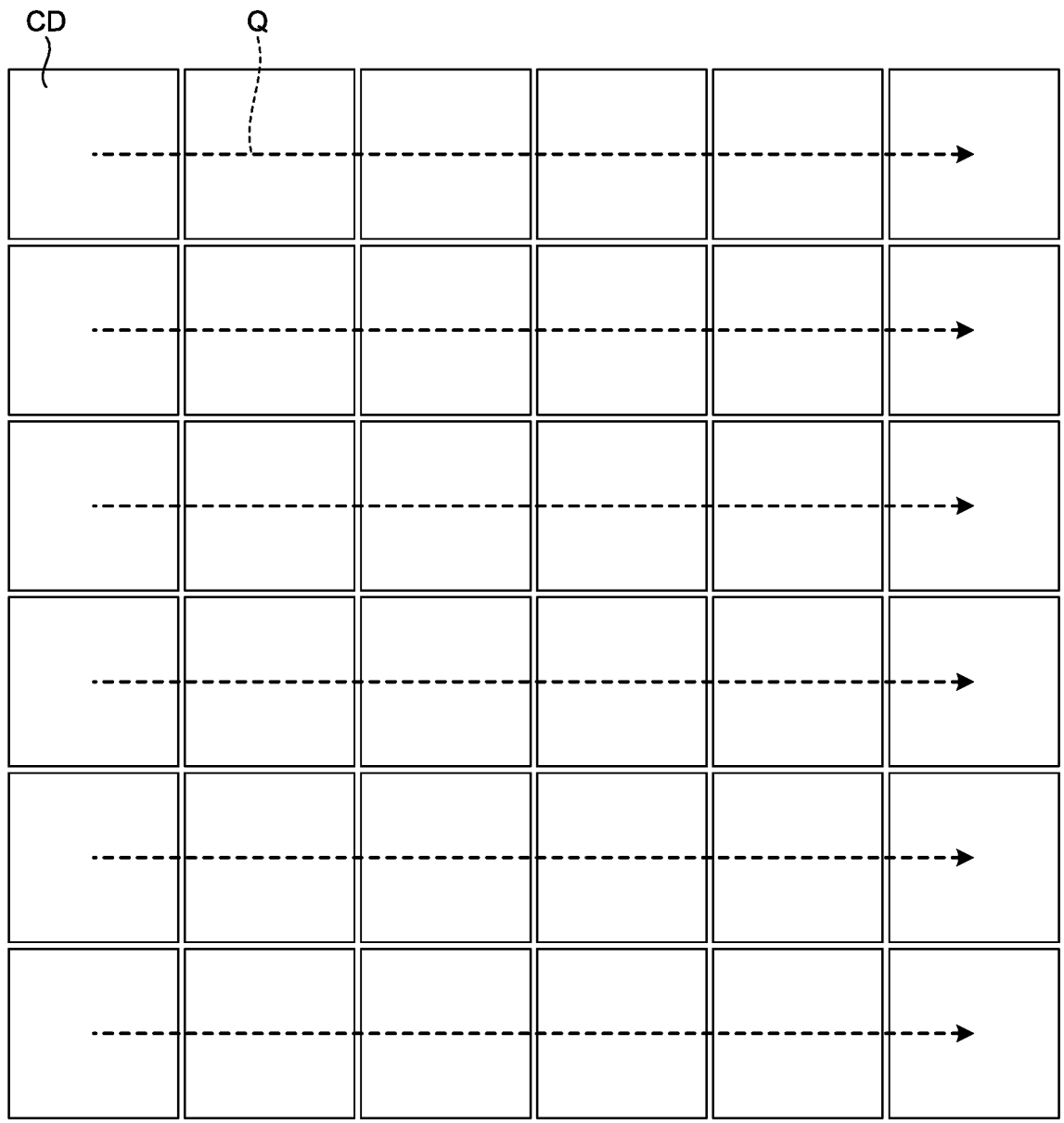
FIG. 22B is a view for explaining an example of arrangement of the first sensor electrodes.

FIG. 22B is a view for explaining an example of arrangement of the first sensor electrodes. Area centers of gravity G of the respective first sensor electrodes CD in FIG. 22B overlap the respective electric-field transmission regions NE illustrated in FIG. 22A in planar view. The length of the electric-field transmission region NE in the first direction Dx passing through the area center of gravity G of one first sensor electrode CD is equal to that of the electric-field transmission region NE in the second direction Dy. This configuration uniforms the degree of attenuation of signals associated with driving of one first sensor electrode CD according to the distance.

Figure 23:
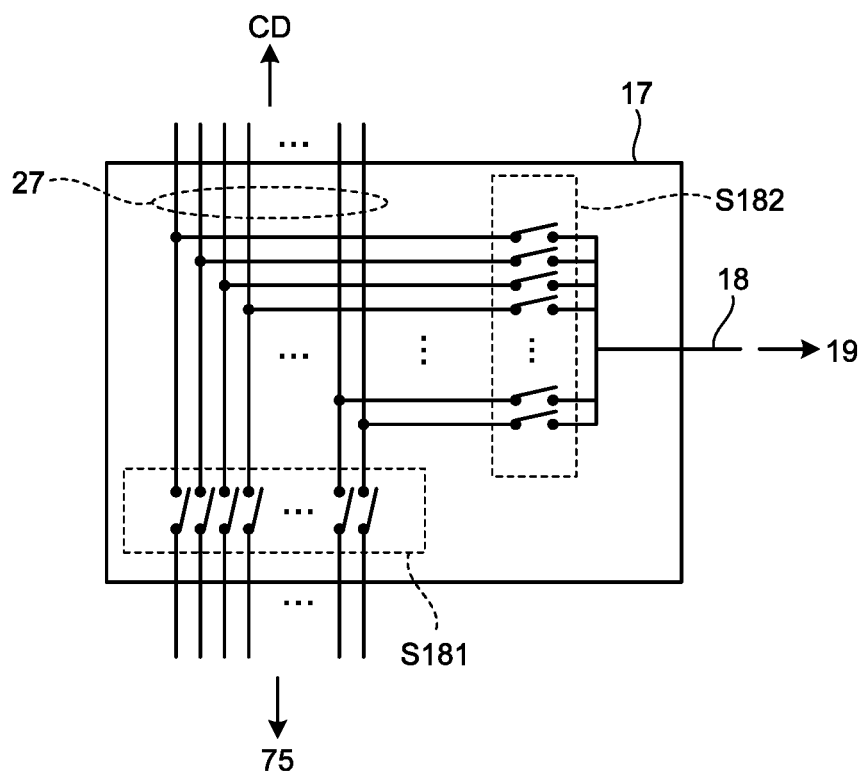
FIG. 23 is a diagram illustrating an example of a coupling switching circuit.

FIG. 23 is diagram illustrating an example of the coupling switching circuit. As illustrated in FIG. 23, the coupling switching circuit 17 includes: switches S181 that switch between coupling and decoupling of the wires 27 to and from the detection IC 75; and switches S182 that switch between coupling and decoupling of the wires 27 to and from the display IC 19. In the display periods Pd1 and Pd2 (refer to FIG. 17), for example, the switches S181 are turned off, and the switches S182 are turned on. As a result, the first sensor electrodes CD are coupled to the display IC 19 via the respective wires 27 and the respective switches S182.

In the detection periods Pt1 and Pt2, the switches S181 are turned on, and the switches S182 are turned off. As a result, the first sensor electrodes CD are coupled to the detection IC 75 via the respective wires 27, the respective switches S181, and the respective wires 77 (refer to FIG. 20) provided to the flexible substrate 73. The switches S181 and S182 are turned on and off, for example, by the drive circuit 14 (refer to FIG. 1).

The drive circuit 14 (refer to FIG. 1) controls the switches S181 to select the first sensor electrodes CD row by row in a scanning direction Q illustrated in FIG. 22B via the wires 27. The drive circuit 14 thus sequentially supplies the first drive signals Vcom1.

Figure 24:
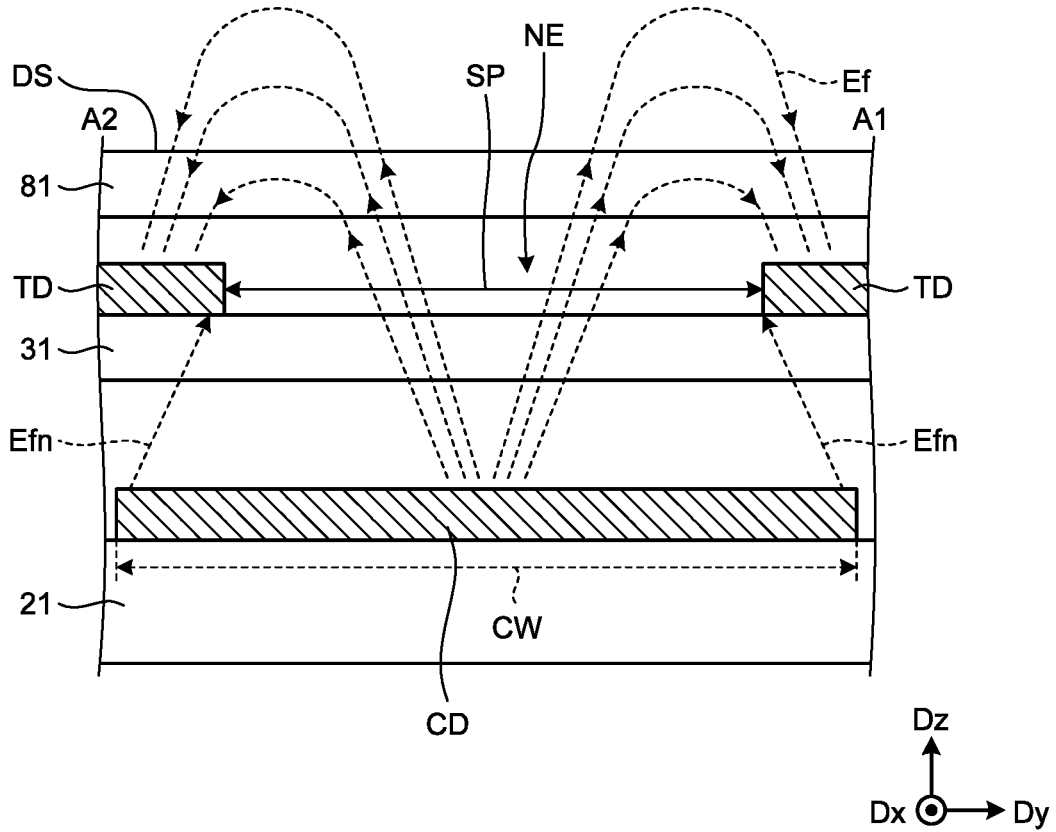
FIG. 24 is a view schematically illustrating lines of electric force of a fringe electric field generated between the first sensor electrode and the second sensor electrode in touch detection.

FIG. 24 is a view schematically illustrating lines of electric force of a fringe electric field generated between the first sensor electrode and the second sensor electrode in touch detection. FIG. 24 is a schematic diagram illustrating a section of one second sensor electrode TD. As illustrated in FIG. 24, the second sensor electrode TD provided to the second substrate 31 is on the upper side than the first sensor electrode CD provided to the first substrate 21. As described above, the second sensor electrode TD serves as a detection electrode in mutual capacitance detection.

As illustrated in FIG. 24, when the first drive signal Vcom1 is supplied to the first sensor electrode CD, lines of electric force Efn of a fringe electric field are generated between the first sensor electrode CD and the second sensor electrode TD. The second sensor electrode TD overlapping the first sensor electrode CD prevents part of the lines of electric force Efn of the fringe electric field from extending from the second sensor electrode TD to the upper side than a detection surface DS. As a result, the electric field is blocked.

With this configuration, the electric-field transmission region NE overlaps the first electrode CD so as not to straddle two first sensor electrodes CD in planar view, thereby increasing the resolution.

At least one electric-field transmission region NE overlaps the first sensor electrode CD. When the first drive signal Vcom1 is supplied to the first sensor electrode CD, lines of electric force Ef of a fringe electric field passing through the electric-field transmission region NE are generated between the first sensor electrode CD and the second sensor electrode TD. In other words, the electric-field transmission region NE formed on the first sensor electrode CD allows the lines of electric force Ef of the fringe electric field to extend from the second sensor electrode TD to the upper side than the display surface DS. In FIG. 18, the detection surface DS corresponds to the surface of the cover glass 81. The detection surface DS is not limited thereto and may be the surface of another member provided at the uppermost part of the display device 1 or the surface of a protective layer provided to the second substrate 31.

The electric-field transmission regions NE according to the first embodiment are not provided with the conductive material of the second sensor electrode TD. Alternatively, the electric-field transmission regions NE may be provided with dummy electrodes not functioning as detection electrodes. The dummy electrodes are made of a conductive material, the electric potential of which is not fixed. Examples of the conductive material include, but are not limited to, a translucent conductive material such as ITO, or metal thin wires made of a metal material, which will be described later, may be used.

As illustrated in FIG. 22A, the outer shape of the electric-field transmission region NE is a square having the same length in the first direction Dx and the second direction Dy. As illustrated in FIG. 22A, the electric-field transmission regions NE overlap the respective first sensor electrodes CD in planar view. In the example illustrated in FIG. 22, the electric-field transmission region NE and the first sensor electrode CD facing the electric-field transmission region NE have a similar shape.

As illustrated in FIG. 24, a width SP of the electric-field transmission region NE in the second direction Dy is smaller than a width CW of the first sensor electrode CD facing the electric-field transmission region NE in the second direction Dy. The electric-field transmission region NE and the first sensor electrode CD each have a square shape so that the width of the electric-field transmission region NE in the first direction Dx is also smaller than that of the facing first sensor electrode CD in the first direction Dx. With this configuration, in each of the second sensor electrodes TD, the electric-field transmission regions NE restrict, for each of the first sensor electrodes CD facing the second sensor electrode TD, the positions where the fringe electric field can reach on the upper side of the detection surface DS.

The shape of the electric-field transmission region NE is line-symmetric with respect to a virtual line passing through the middle point in the first direction Dx and extending in the second direction Dy and line-symmetric with respect to a virtual line passing through the middle point in the second direction Dy and extending in the first direction Dx. This configuration uniforms the degree of attenuation of signals associated with driving of one first sensor electrode CD according to the distance. This reduces the influence of driving of the first sensor electrode CD on driving of another first sensor electrode CD adjacent to the driven first sensor electrode CD. As illustrated in FIG. 24, the middle point of the width SP of the electric-field transmission region NE in the second direction Dy coincides with the middle point of the width CW of the facing first sensor electrode CD in the second direction Dy. This configuration further uniforms the distribution of the fringe electric fields passing through the respective electric-field transmission regions NE.

As described above, when an object being detected is present, the detection circuit 40 obtains the coordinates of the object being detected. In this case, the detection circuit 40 identifies the first sensor electrode CD supplied with the first drive signals Vcom1. In the second sensor electrode TD overlapping the identified first sensor electrode CD, the detection circuit 40 detects the object being detected in contact with the detection surface based on the first detection signals Vdet1 corresponding to a change in mutual capacitance between the first sensor electrode CD and the second sensor electrode TD. Specifically, the detection circuit 40 identifies the second sensor electrode TD having a change in mutual capacitance and outputs the coordinates of the first sensor electrode CD identified to be the one supplied with the first drive signal Vcom1, out of the first sensor electrodes CD overlapping the identified second sensor electrode TD, as the position of the object being detected.

Even if the area covering the first sensor electrodes CD increases due to an increase in the area of the second sensor electrodes TD in planar view, the detection device according to the first embodiment can output the position of the object being detected.

As described above, the detection device according to the present disclosure includes: a plurality of first sensor electrodes CD disposed side by side in the first direction Dx and the second direction Dy intersecting the first direction Dx; and a plurality of second sensor electrodes TD disposed side by side in the first direction Dx and the second direction Dy. One second sensor electrode TD overlaps a plurality of first sensor electrodes CD in planar view.

Consequently, the second sensor electrodes TD serve as detection electrodes in hover detection. The size of one second sensor electrode TD in planar view is larger than that of one first sensor electrode CD. As illustrated in FIGS. 21 and 22A, the second sensor electrodes TD each have an area overlapping a plurality of first sensor electrodes CD. With this structure, the second sensor electrodes TD have a larger area, thereby increasing the detection sensitivity in hover detection.

As illustrated in FIG. 18, the second sensor electrodes TD according to the present disclosure are arrayed in a matrix (row-column configuration) in the active area 10a. In other words, as illustrated in FIG. 20, the second sensor electrodes TD are arrayed in the first direction Dx and the second direction Dy.

As described above, in touch detection (mutual capacitance method), the detection device drives the first sensor electrodes CD and detects the position of an object being detected in the present state at the positions of the respective electric-field transmission regions NE in the second sensor electrodes TD. In hover detection (self-capacitance method), the detection device detects an object being detected in the non-contact state at the positions of the second sensor electrodes TD.

Figure 25:
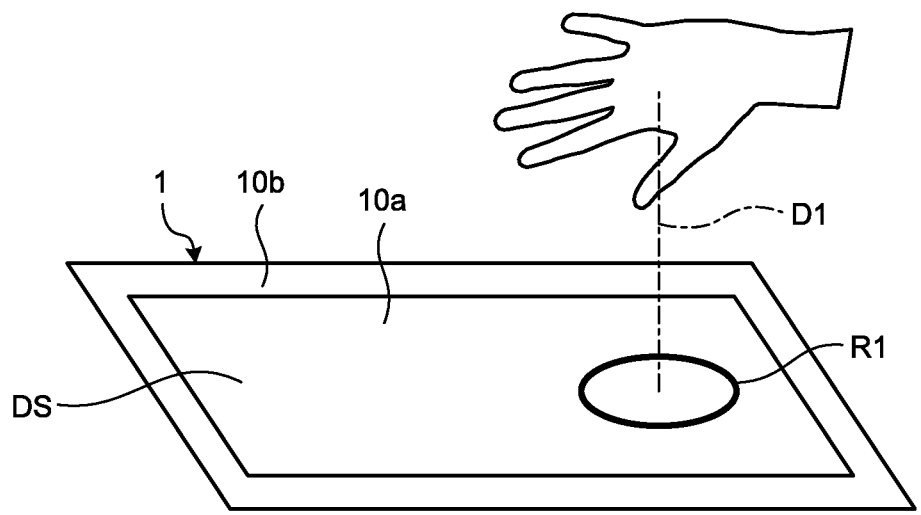
FIG. 25 is a view for explaining an example of hover detection according to the first embodiment.
Figure 26:
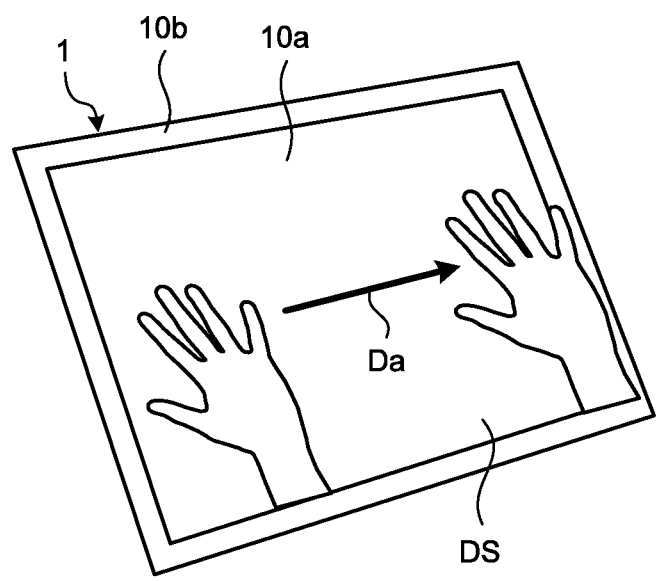
FIG. 26 is a view for explaining another example of hover detection according to the first embodiment.

FIG. 25 is a view for explaining an example of hover detection according to the first embodiment. FIG. 26 is a view for explaining another example of hover detection according to the first embodiment. As illustrated in FIG. 25, the display device 1 performs hover detection when a finger of an operator serving as an object being detected is in the non-contact state with respect to the detection surface DS. The detection circuit 40 can detect a distance D1 between the detection surface DS and the object being detected in a direction perpendicular to the detection surface DS based on the second detection signals Vdet2. The detection circuit 40 can also detect a position R1 of the object being detected based on the second detection signals Vdet2. The position R1 of the object being detected is a position facing the object being detected in the direction perpendicular to the detection surface DS, for example. The position R1 corresponds to the second sensor electrode TD having the largest value of the second detection signals Vdet2 supplied from the second sensor electrodes TD.

As illustrated in FIG. 26, the display device 1 can detect a movement, such as a gesture, of an object being detected. When an object being detected in the non-contact state with respect to the detection surface DS moves in the direction of the arrow Da, the detection circuit 40 calculates the change in the position of the object being detected based on the second detection signals Vdet2. The detection circuit 40 thus detects a movement, such as a gesture, of the object being detected. Based on the results of hover detection, the control circuit 11 (refer to FIG. 1) performs a predetermined display operation or detection operation.

As described above, the second sensor electrodes TD each serve as one detection electrode in self-capacitance hover detection. In hover detection, the drive circuit 14 supplies the guard signals Vgd to the first sensor electrodes CD. The first sensor electrodes CD are driven at the same electric potential as that of the second sensor electrodes TD. This configuration can reduce stray capacitance between the second sensor electrodes TD and the first sensor electrodes CD, thereby increasing the detection accuracy in hover detection. In other words, the first sensor electrodes CD serve as guard electrodes in hover detection.

Figure 27:
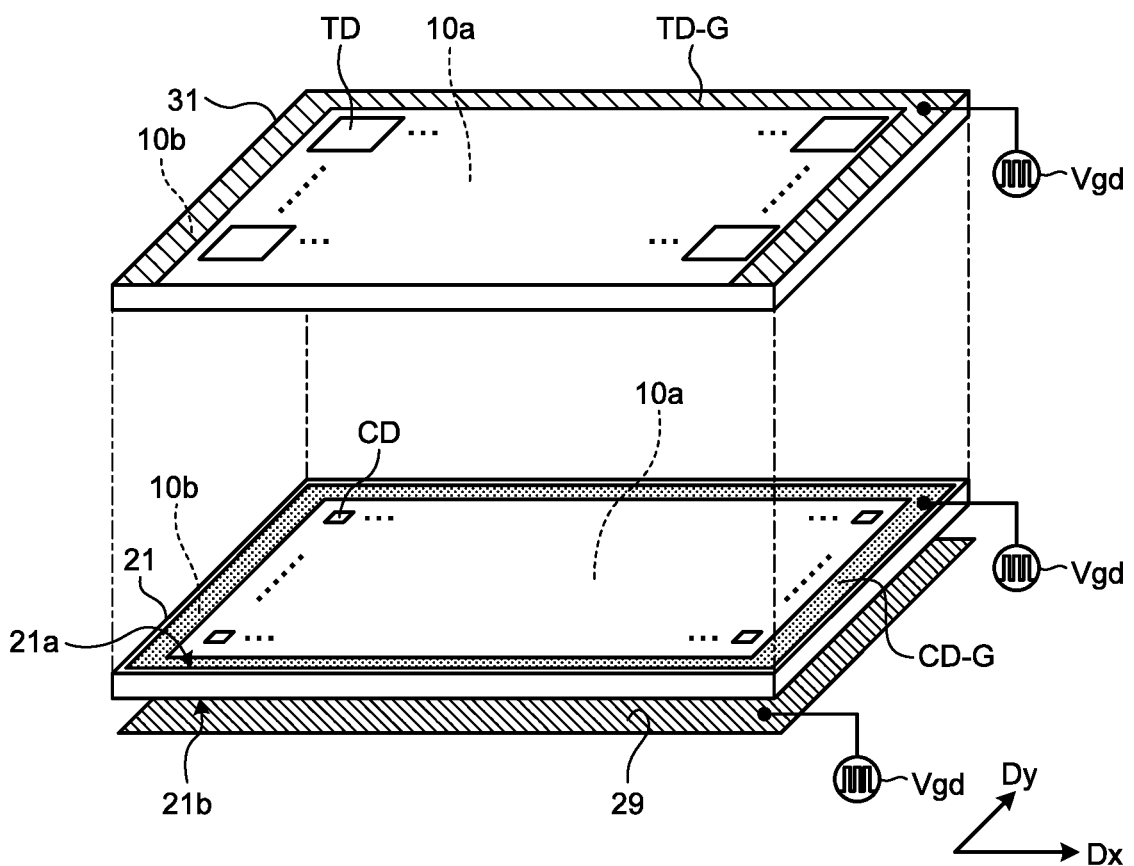
FIG. 27 is a perspective view illustrating an example of arrangement of the second sensor electrodes and the first sensor electrodes.

FIG. 27 is a perspective view illustrating an example of arrangement of the second sensor electrodes and the first sensor electrodes. As described above, when the display device 1 performs self-capacitance hover detection, an outer edge wire TD-G is supplied with the guard signals Vgd having the same waveform as that of the second drive signals Vself for detection and synchronized with the second drive signals Vself. As described above, the drive circuit 14 supplies the guard signals Vgd to the outer edge wire TD-G in hover detection. The guard signal Vgd is a voltage signal synchronized with the second drive signal Vself and having the same electric potential as that of the second drive signal Vself. This configuration can reduce stray capacitance in the second sensor electrodes TD, thereby increasing the detection accuracy. Instead of being supplied with the guard signals Vgd, the outer edge wire TD-G may be brought into a state of not being electrically coupled to any component (high impedance).

The first sensor electrodes CD are provided in the active area 10a on the first surface 21a of the first substrate 21. The first surface 21a is opposite to the surface facing the first substrate 21, for example.

As illustrated in FIG. 27, the peripheral region 10b on the first surface 21a of the first substrate 21 is provided with an outer edge wire CD-G. The outer edge wire CD-G, for example, is provided continuously along the long sides and the short sides of the active area 10a and surrounds the active area 10a. When the display device 1 performs self-capacitance hover detection, the outer edge wire CD-G may be supplied with the guard signals Vgd having the same waveform as that of the second drive signals Vself for detection and synchronized with the second drive signals Vself. Alternatively, the outer edge wire CD-G may be brought into a state of not being electrically coupled to any component (high impedance). This configuration can prevent generation of capacitance between the outer edge wire CD-G and the first sensor electrodes CD supplied with the second drive signals Vself, thereby increasing the detection sensitivity in hover detection.

The present embodiment may include an outer edge wire 29 on the second surface 21b of the first substrate 21 illustrated in FIG. 27. The outer edge wire 29 on the back surface may cover part of the second surface 21b of the first substrate 21 or the whole of the second surface 21b. The outer edge wire 29 on the back surface may be made of, for example, a translucent conductive material, such as ITO, or may be a metal frame, which is not illustrated. When the display device 1 performs self-capacitance hover detection, the outer edge wire 29 on the back surface may be supplied with the guard signals Vgd having the same waveform as that of the second drive signals Vself for detection and synchronized with the second drive signals Vself. Alternatively, the outer edge wire 29 on the back surface may be brought into a state of not being electrically coupled to any component (high impedance). This configuration can prevent generation of capacitance between the outer edge wire 29 on the back surface and the first sensor electrodes CD supplied with the second drive signals Vself, thereby increasing the sensitivity in hover detection.

As described above, the second sensor electrodes TD serve not only as detection electrodes in mutual capacitance touch detection but also as detection electrodes in self-capacitance hover detection. One second sensor electrode TD according to the present embodiment has a larger area. This configuration enables the lines of electric force of an electric field generated from the second sensor electrode TD to reach a position farther away from the detection surface DS. Consequently, the display device 1 can perform touch detection accurately and hover detection desirably using the second sensor electrodes TD in both touch detection and hover detection.

The second sensor electrodes TD according to the present embodiment are provided to the second substrate 31. With this configuration, the space between the second sensor electrodes TD and various kinds of circuits, such as the switching elements Tr, and various kinds of wiring, such as the data lines SGL and the gate lines GCL, can be made larger than in a case where the second sensor electrodes TD are provided to the first substrate 21. Consequently, the present embodiment can perform hover detection accurately by reducing stray capacitance formed between the second sensor electrodes TD and the various kinds of circuits and wiring.

As described above, the second sensor electrodes TD in the sensor 30 serving as the detection device each have a plurality of electric-field transmission regions. One electric-field transmission region NE overlaps one first sensor electrode CD in planar view and does not straddle two first sensor electrodes CD in planar view. If adjacent first sensor electrodes CD each have information about an object being detected, the detection device can detect the objects to be detected individually in touch detection. Even if the second sensor electrodes TD have a larger area in planar view, the fringe electric fields passing through the second sensor electrodes TD are less likely to be reduced, thereby enabling touch detection. As a result, the detection device in the sensor region can perform touch detection and hover detection using the same second sensor electrodes TD.

Figure 28:
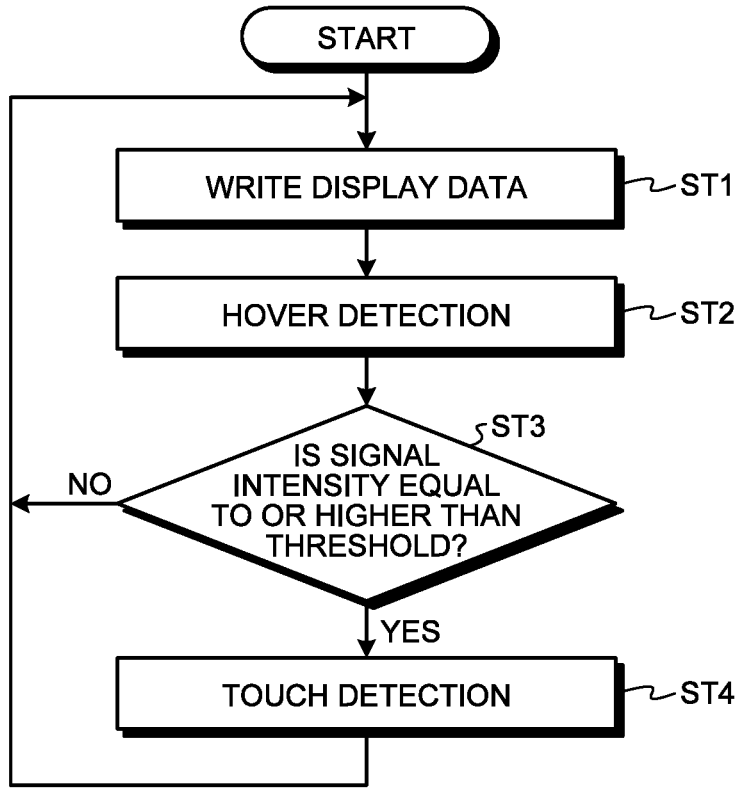
FIG. 28 is a flowchart of an exemplary operation performed by the display device according to the first embodiment.
Figure 29:
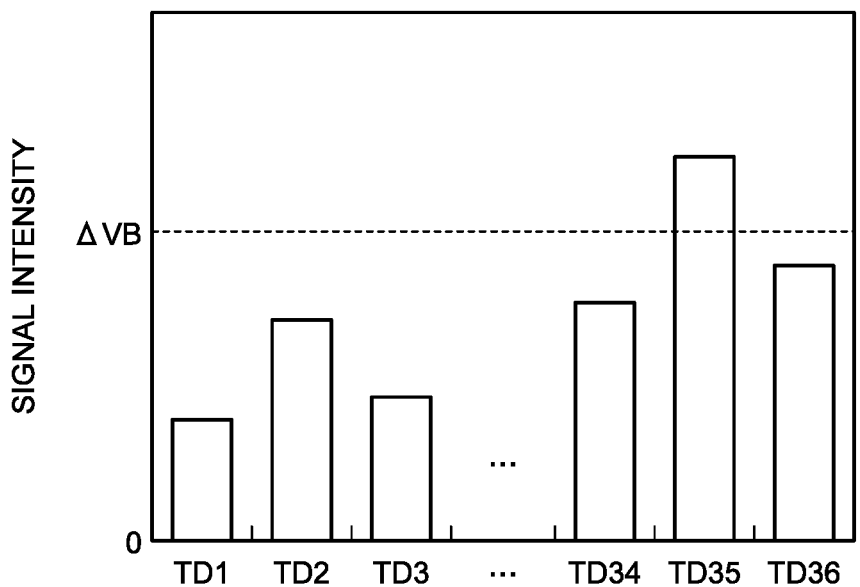
FIG. 29 is a graph schematically illustrating relations between the second sensor electrodes and signal intensities.
Figure 30:
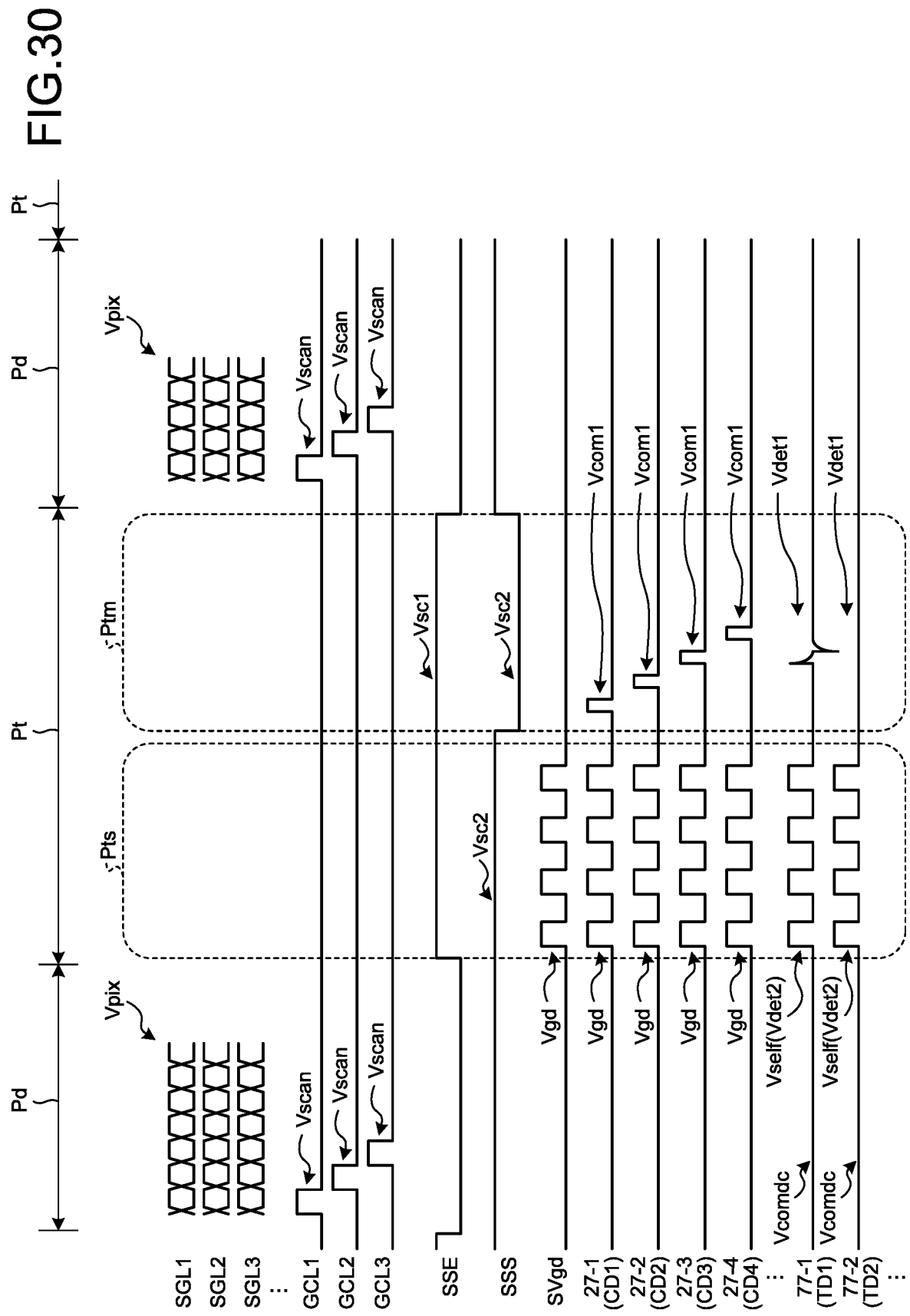
FIG. 30 is a timing waveform chart illustrating an exemplary operation performed by the display device according to the first embodiment.

The following describes an exemplary operation according to the present embodiment with reference to FIG. 1 and FIGS. 28 to 30. FIG. 28 is a flowchart of an exemplary operation performed by the display device according to the first embodiment. FIG. 29 is a graph schematically illustrating relations between the second sensor electrodes and signal intensities. FIG. 30 is a timing waveform chart illustrating an exemplary operation performed by the display device according to the first embodiment. The exemplary operation illustrated in FIGS. 28 to 30 is given by way of example only and may be appropriately modified.

As illustrated in FIG. 30, a display period Pd and a detection period Pt are alternately arranged in a time-division manner. The detection period Pt includes a hover detection period Pts and a touch detection period Ptm. The execution order of the display period Pd, the hover detection period Pts, and the touch detection period Ptm is given by way of example only and may be appropriately modified. For example, one detection period Pt may include only one of the hover detection period Pts and the touch detection period Ptm. The display device 1 may perform touch detection on one detection surface in one touch detection period Ptm or in a plurality of touch detection periods Ptm separately. The display device 1 may display an image of one frame in one display period Pd. Alternatively, a plurality of display periods Pd and a plurality of detection periods Pt may be alternately arranged during display of an image of one frame.

As illustrated in FIG. 28, the control circuit 11 writes display data (Step ST1). Specifically, in the same manner as the display operation described above, the source driver 13 supplies the pixel signals Vpix to the sub-pixels SPix corresponding to gate lines GCL1, GCL2, and GCL3 via data lines SGL1, SGL2, and SGL3. The sub-pixels SPix perform display in units of one horizontal line based on the supplied pixel signals Vpix. The coupling switching circuit 17 illustrated in FIG. 23 operates, and the drive circuit 14 supplies the display drive signals Vcomdc to the first sensor electrodes CD in the display period Pd.

Subsequently, the control circuit 11 performs hover detection (Step ST2). Specifically, as illustrated in FIG. 30, the control circuit 11 supplies a control signal Vsc1 to the detection IC 75 via a signal line SSE and supplies a control signal Vsc2 to the detection IC 75 via a signal line SSS in the hover detection period Pts. The control signal Vsc1 is a signal for operating the detection device. The control signal Vsc2 is a signal for determining whether to operate the detection device by the self-capacitance method or the mutual capacitance method. In the hover detection period Pts, the sensor 30 operates by the self-capacitance method.

In the hover detection period Pts, the drive circuit 14 supplies the second drive signals Vself to a second sensor electrode TD1 and a second sensor electrode TD2. A wire 77-1 is electrically coupled to one of the second sensor electrodes TD (e.g., the second sensor electrode TD1). A wire 77-2 is electrically coupled to another one of the second sensor electrodes TD (e.g., the second sensor electrode TD2). Similarly, a wire 77-3 and wires subsequent thereto, which are not illustrated, are electrically coupled to the respective second sensor electrodes TD. With this configuration, the display device 1 can detect an object being detected in the non-contact state in each of the second sensor electrodes TD disposed side by side in the first direction Dx and the second direction Dy. The detection circuit 40, for example, can detect the distance D1 between the detection surface DS and the object being detected in the direction perpendicular to the detection surface DS based on the second detection signals Vdet2 supplied from the respective second sensor electrodes TD. The detection circuit 40 can also detect the position R1 of the object being detected based on the second detection signals Vdet2 supplied from the respective second sensor electrodes TD. The drive circuit 14 supplies the guard signals Vgd to wires 27-1, 27-2, 27-3, 27-4, . . . coupled to the respective second sensor electrodes TD in the hover detection period Pts.

Subsequently, the detection circuit 40 determines whether the second detection signals Vdet2 supplied from the respective second sensor electrodes TD are equal to or higher than a predetermined threshold $\Delta$VB (Step ST3). As illustrated in FIG. 29, the detection circuit 40 calculates the signal intensities of the second detection signals Vdet2 supplied from the respective second sensor electrodes TD and compares them with the predetermined threshold $\Delta$VB.

If the signal intensity of any one of the second detection signals Vdet2 is equal to or higher than the threshold $\Delta$VB (Yes at Step ST3), the control circuit 11 performs touch detection (Step ST4). If the signal intensity of the second detection signal Vdet2 is equal to or higher than the threshold $\Delta$VB, the detection circuit 40 determines that the object being detected is in the contact state.

Assume a case where 36 second sensor electrodes TD from TD1 to TD36 are provided, as illustrated in FIG. 29. The signal intensity of the second detection signal Vdet2 supplied from the second sensor electrode TD35 is equal to or higher than the threshold $\Delta$VB. The signal intensities of the second detection signals Vdet2 supplied from the other second sensor electrodes TD are lower than the threshold $\Delta$VB. In this case, the detection circuit 40 determines that the object being detected is in the contact state at the position corresponding to the second sensor electrode TD35. The control circuit 11 switches from hover detection to touch detection based on the information received from the detection circuit 40.

Specifically, as illustrated in FIG. 30, the control circuit 11 supplies the control signal Vsc1 to the detection IC 75 and supplies the control signal Vsc2 to the detection IC 75 in the touch detection period Ptm. Consequently, the sensor 30 operates by the mutual capacitance method.

The drive circuit 14 sequentially supplies the first drive signals Vcom1 to the wires 27-1, 27-2, 27-3, 27-4, . . . coupled to the respective first sensor electrodes CD, such as the first sensor electrodes CD1, CD2, CD3, CD4, . . . overlapping the second sensor electrode TD35 in planar view. The first detection signals Vdet1 corresponding to changes in capacitance between the second sensor electrode TD and the first sensor electrodes CD are supplied from the second sensor electrode TD35 to the detection circuit 40 via the wire 77-1 at each of the positions of the electric-field transmission regions NE in the second sensor electrode TD. Consequently, the display device 1 can detect the object being detected in the contact state at each of the positions of the electric-field transmission regions NE in the second sensor electrodes TD.

As illustrated in FIG. 30, for example, the first sensor electrode CD coupled to the wire 27-3 is identified as the first sensor electrode CD having a change in mutual capacitance. The wire 77-1 coupled to the second sensor electrode TD35 has a change in mutual capacitance, but the wire 77-2 coupled to the second sensor electrode different from the second sensor electrode TD35 has no change.

In the touch detection period Ptm, if the detection operation on one detection surface is finished, that is, if the control circuit 11 sequentially supplies the first drive signals Vcom1 to the first sensor electrodes CD overlapping the second sensor electrode TD35 to perform touch detection, the control circuit 11 finishes touch detection and returns to the writing of display data (Step ST1).

If the signal intensities of all the second detection signals Vdet2 are lower than the threshold ΔVB (No at Step ST3), the control circuit 11 does not perform touch detection and returns to writing of display data (Step ST1). In this case, in the detection period Pt illustrated in FIG. 25, the control circuit 11 performs only the processing of the hover detection period Pts and does not perform the processing of the touch detection period Ptm. In other words, only the hover detection period Pts is present in one detection period Pt.

Although not illustrated in FIG. 30, the data lines SGL in the hover detection period Pts and the touch detection period Ptm are preferably in a floating state. This mechanism can reduce capacitance between the second sensor electrodes TD and the data lines SGL. The gate lines GCL may be in a floating state in the hover detection period Pts.

The exemplary operation illustrated in FIGS. 28 to 30 is given by way of example only and may be appropriately modified. The display device 1, for example, may perform hover detection while changing the number of second sensor electrodes TD included in one detection electrode in a plurality of hover detection periods Pts. Two second sensor electrodes TD disposed side by side in the first direction Dx and two second sensor electrodes TD disposed side by side in the second direction Dy may be electrically coupled by the switching circuit to serve as one detection electrode. As described above, one second sensor electrode TD may include two or more second sensor electrodes TD disposed side by side in the first direction Dx and two or more second sensor electrodes TD disposed side by side in the second direction Dy. Alternatively, one second sensor electrode TD may include three or more second sensor electrodes TD disposed side by side in the first direction Dx and three or more second sensor electrodes TD disposed side by side in the second direction Dy. For example, all the second sensor electrodes TD in the active area 10a may be electrically coupled by the switching circuit to serve as one second sensor electrode TD. The control circuit 11 can change the resolution in hover detection by changing the number of second sensor electrodes TD included in one detection electrode depending on the distance D1 between the detection surface DS and the object being detected.

As described above, the sensor 30 can desirably perform touch detection and hover detection.

In one second sensor electrode TD, the position of one electric-field transmission region NE does not overlap a plurality of drive electrodes. If the detection circuit 40 can identify the second sensor electrode TD having a change in mutual capacitance out of the second sensor electrodes TD and identify the first sensor electrode CD supplied with the first drive signal Vcom1, the detection circuit 40 can use the position of the first sensor electrode CD identified in the first direction Dx and the second direction Dy as the coordinates of the object being detected. Even if the second sensor electrodes TD have a larger area in planar view, the detection device according to the first embodiment can increase the detection sensitivity in touch detection. As a result, the second sensor electrodes TD have a larger area in planar view, thereby increasing the detection sensitivity in hover detection.

Consequently, the display device 1 according to the present embodiment can desirably perform touch detection and hover detection using the second sensor electrodes TD both in touch detection and hover detection.

Second Embodiment

FIG. 31 is a view for explaining an example of arrangement of the second sensor electrodes according to a second embodiment. The components described in the first embodiment are denoted by like reference numerals, and explanation thereof is omitted.

As illustrated in FIG. 31, the electric-field transmission regions NE overlap the respective first sensor electrodes CD in planar view. As illustrated in FIG. 31, the region or the outer shape of the electric-field transmission region NE is a rhombus having the same length in the first direction Dx and the second direction Dy. In other words, one electric-field transmission region NE has a square shape, and an extension of one side of one electric-field transmission region NE intersects a side of one first sensor electrode CD overlapping the electric-field transmission region.

The electric-field transmission region NE overlaps the first electrode CD so as not to straddle two first sensor electrodes CD in planar view, thereby increasing the resolution. The shape of the electric-field transmission region NE is line-symmetric with respect to a virtual line passing through the middle point in the first direction Dx and extending in the second direction Dy and line-symmetric with respect to a virtual line passing through the middle point in the second direction Dy and extending in the first direction Dx. This configuration uniforms the degree of attenuation of signals associated with driving of one first sensor electrode CD according to the distance. This reduces the influence of driving of the first sensor electrode CD on driving of another first sensor electrode CD adjacent to the driven first sensor electrode CD.

Third Embodiment

Figure 32:
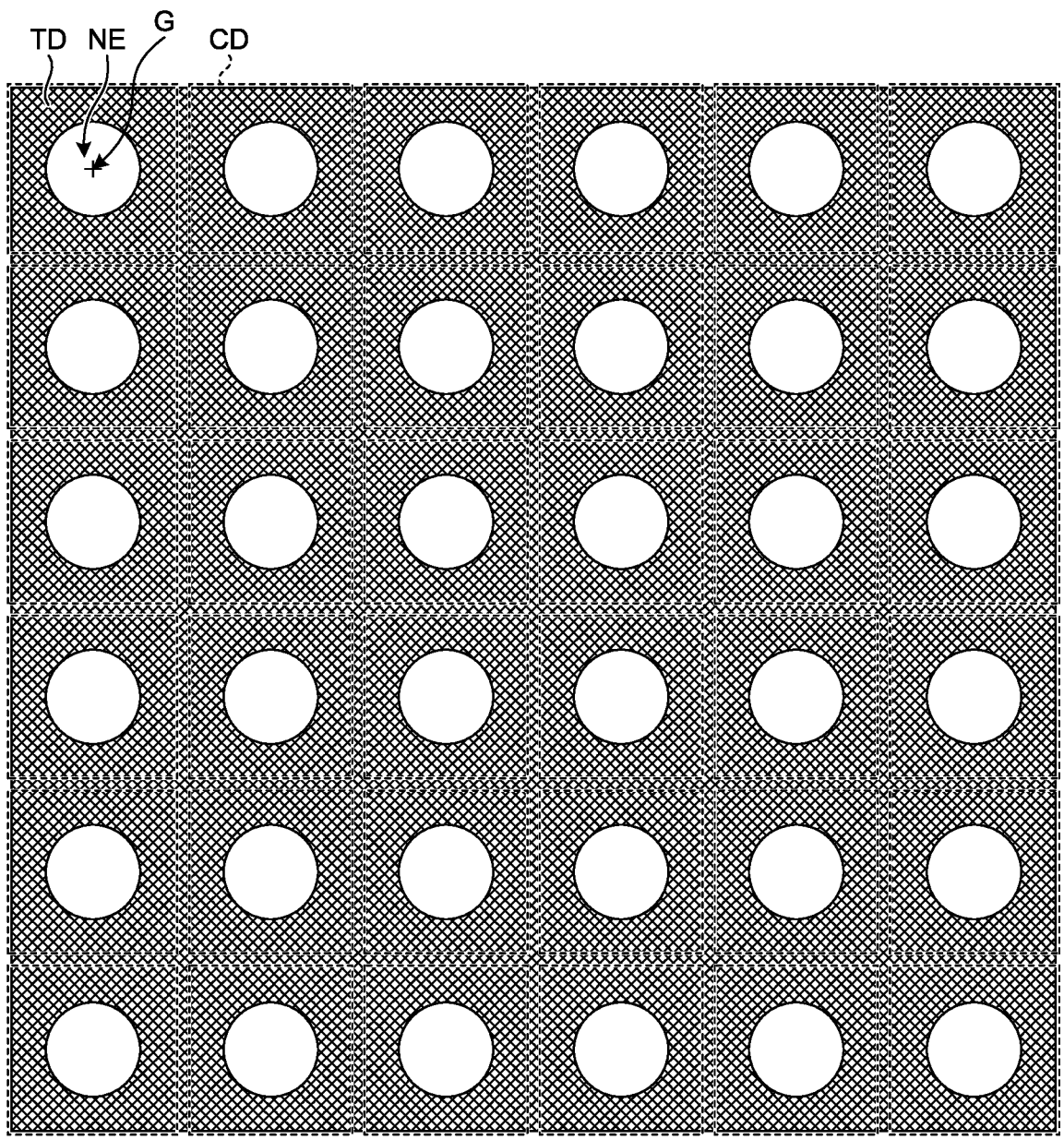
FIG. 32 is a view for explaining an example of arrangement of the second sensor electrodes according to a third embodiment.

FIG. 32 is a view for explaining an example of arrangement of the second sensor electrodes according to a third embodiment. The components described in the first embodiment are denoted by like reference numerals, and explanation thereof is omitted.

As illustrated in FIG. 32, the region or the outer shape of the electric-field transmission region NE is a circle having the same length in the first direction Dx and the second direction Dy. As illustrated in FIG. 32, the electric-field transmission regions NE overlap the respective first sensor electrodes CD in planar view. With this configuration, the lines of electric force travel from the electric-field transmission region NE uniformly at 360 degrees, thereby equalizing the signal sensitivity, provided that distances from the area center of gravity G of the corresponding first sensor electrode CD are equal.

The electric-field transmission region NE overlaps the first electrode CD so as not to straddle two first sensor electrodes CD in planar view, thereby increasing the resolution. The shape of the electric-field transmission region NE is line-symmetric with respect to a virtual line passing through the middle point in the first direction Dx and extending in the second direction Dy and line-symmetric with respect to a virtual line passing through the middle point in the second direction Dy and extending in the first direction Dx. This configuration uniforms the degree of attenuation of signals associated with driving of one first sensor electrode CD according to the distance. This reduces the influence of driving of the first sensor electrode CD on driving of another first sensor electrode CD adjacent to the driven first sensor electrode CD.

Fourth Embodiment

Figure 33:
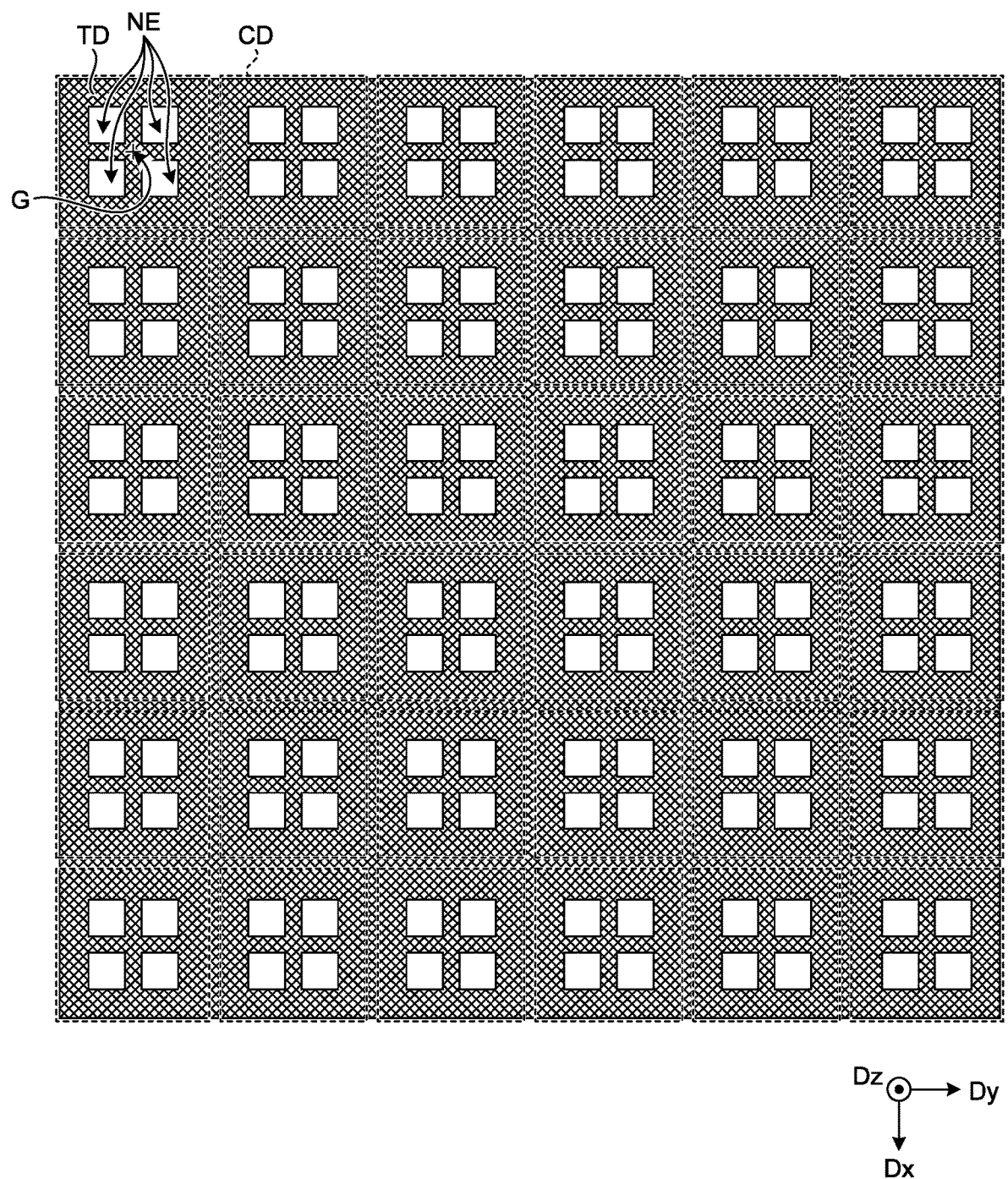
FIG. 33 is a view for explaining an example of arrangement of the second sensor electrodes according to a fourth embodiment.
Figure 34:
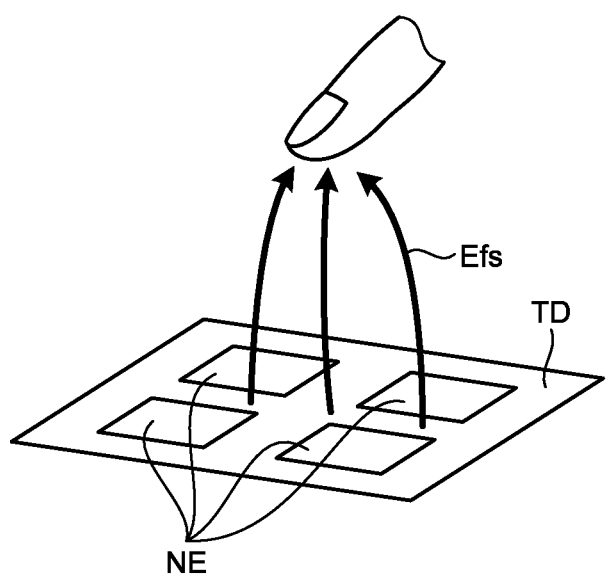
FIG. 34 is a view for explaining an exemplary state of an electric field of the second sensor electrode according to the fourth embodiment.

FIG. 33 is a view for explaining an example of arrangement of the second sensor electrodes according to a fourth embodiment. FIG. 34 is a view for explaining an exemplary state of an electric field of the second sensor electrode according to the fourth embodiment. The components described in the first embodiment are denoted by like reference numerals, and explanation thereof is omitted.

As illustrated in FIG. 33, the electric-field transmission region NE has four regions, and the outer shape of the regions is a square having the same length in the first direction Dx and the second direction Dy. As illustrated in FIG. 32, the four electric-field transmission regions NE overlap one first sensor electrode CD in planar view.

The electric-field transmission region NE does not overlap two first sensor electrodes CD in planar view, thereby increasing the resolution. The shape of the electric-field transmission region NE is line-symmetric with respect to a virtual line passing through the middle point in the first direction Dx and extending in the second direction Dy and line-symmetric with respect to a virtual line passing through the middle point in the second direction Dy and extending in the first direction Dx. This configuration uniforms the degree of attenuation of signals associated with driving of one first sensor electrode CD according to the distance. This reduces the influence of driving of the first sensor electrode CD on driving of another first sensor electrode CD adjacent to the driven first sensor electrode CD.

As illustrated in FIG. 34, a conductive material is present between the electric-field transmission regions NE. This configuration increases the number of lines of electric force Efs, thereby increasing the detection sensitivity in hover detection.

Fifth Embodiment

Figure 35:
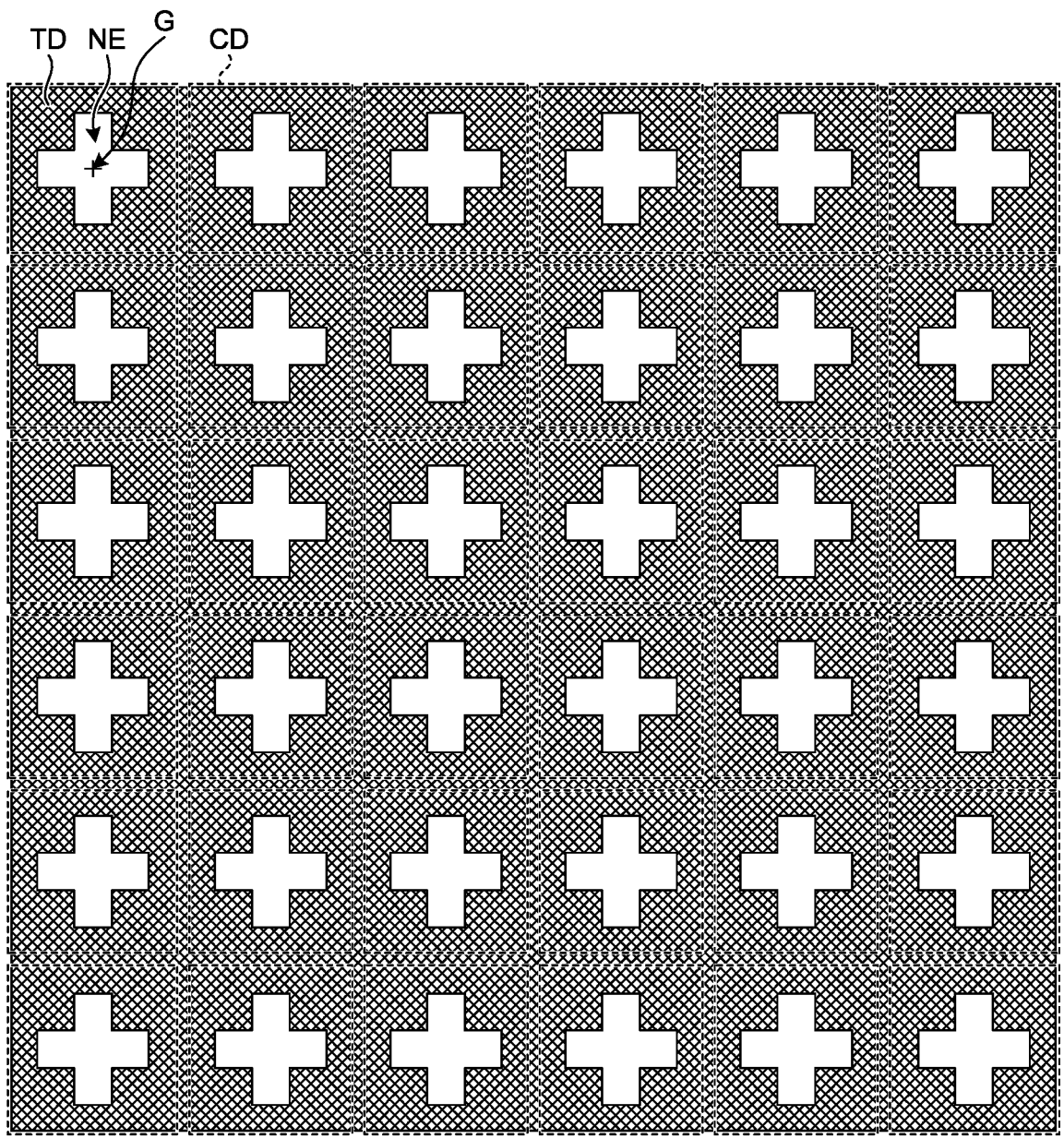
FIG. 35 is a view for explaining an example of arrangement of the second sensor electrodes according to a fifth embodiment.
Figure 36:
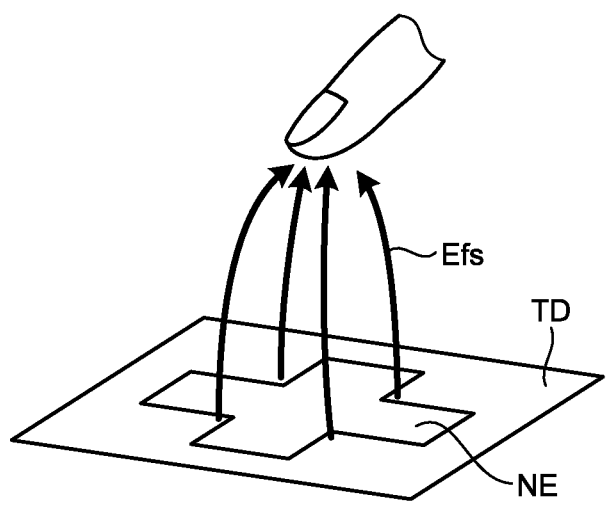
FIG. 36 is a view for explaining an exemplary state of an electric field of the second sensor electrode according to the fifth embodiment.

FIG. 35 is a view for explaining an example of arrangement of the second sensor electrodes according to a fifth embodiment. FIG. 36 is a view for explaining an exemplary state of an electric field of the second sensor electrode according to the fifth embodiment. The components described in the first embodiment are denoted by like reference numerals, and explanation thereof is omitted.

As illustrated in FIG. 35, the region of the electric-field transmission region NE has a cross shape, and the outer shape thereof has the same length in the first direction Dx and the second direction Dy. As illustrated in FIG. 35, the electric-field transmission region NE overlaps one first sensor electrode CD in planar view.

The electric-field transmission region NE overlaps the first electrode CD so as not to straddle two first sensor electrodes CD in planar view, thereby increasing the resolution. The shape of the electric-field transmission region NE is line-symmetric with respect to a virtual line passing through the middle point in the first direction Dx and extending in the second direction Dy and line-symmetric with respect to a virtual line passing through the middle point in the second direction Dy and extending in the first direction Dx. This configuration uniforms the degree of attenuation of signals associated with driving of one first sensor electrode CD according to the distance. This reduces the influence of driving of the first sensor electrode CD on driving of another first sensor electrode CD adjacent to the driven first sensor electrode CD.

As illustrated in FIG. 36, the cross-shaped electric-field transmission region NE has a larger amount of conductive material at the center part. This configuration increases the number of lines of electric force Efs, thereby increasing the detection sensitivity in hover detection.

Sixth Embodiment

Figure 37:
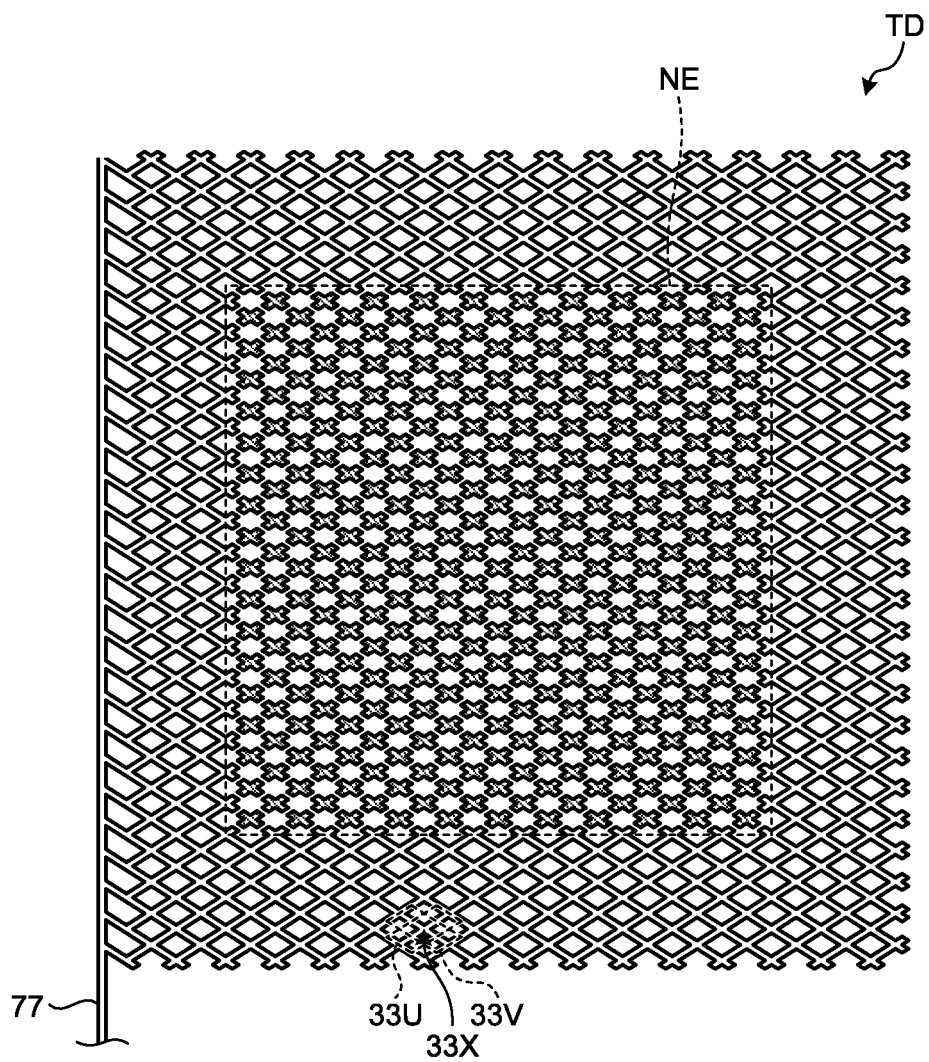
FIG. 37 is a schematic diagram of the second sensor electrode according to a sixth embodiment.

FIG. 37 is a schematic diagram illustrating the second sensor electrodes according to the sixth embodiment. Components described in the first to the fifth embodiments are denoted by like reference numerals, and explanation thereof is omitted.

The second sensor electrode TD according to the fourth embodiment includes at least one first conductive thin wire 33U and at least one second conductive thin wire 33V intersecting the first conductive thin wire 33U. The first conductive thin wire 33U and the second conductive thin wire 33V are electrically coupled at a coupling portion 33X. A plurality of first conductive thin wires 33U intersect a plurality of second conductive thin wires 33V at a plurality of intersections to form meshes of the second sensor electrode TD, each mesh having a parallelogram shape. The first conductive thin wire 33U and the second conductive thin wire 33V incline in opposite directions with respect to a direction parallel to the first direction Dx.

While the second sensor electrode TD includes the first conductive thin wires 33U and the second conductive thin wires 33V, the area of the second sensor electrode TD according to the present disclosure includes the area of openings surrounded by the first conductive thin wires 33U and the second conductive thin wires 33V besides the area of the first conductive thin wires 33U and the second conductive thin wires 33V. In other words, the area of the second sensor electrode TD corresponds to the area of a substantially rectangular region surrounding the first conductive thin wires 33U and the second conductive thin wires 33V.

The first conductive thin wires 33U and the second conductive thin wires 33V have a narrow width. In the active area 10a illustrated in FIG. 27, the first conductive thin wires 33U are disposed with spaces interposed therebetween in the second direction Dy. The second conductive thin wires 33V are disposed with spaces interposed therebetween in the second direction Dy.

First ends in the extending directions of the first conductive thin wires 33U and the second conductive thin wires 33V are coupled to the wire 77. With this configuration, the first conductive thin wires 33U and the second conductive thin wires 33V are electrically coupled to serve as one second sensor electrode TD. One second sensor electrode TD according to the present embodiment is coupled to one wire 77. The second sensor electrode TD has a substantially rectangular shape. The shape is not limited thereto, and the second sensor electrode TD may have another shape, such as a square, polygonal, or elliptic shape.

The first conductive thin wires 33U and the second conductive thin wires 33V are metal layers made of one or more of Al, Cu, Ag, Mo, Cr, and W. Alternatively, the first conductive thin wires 33U and the second conductive thin wires 33V are made of an alloy including one or more of the metal materials described above. The first conductive thin wires 33U and the second conductive thin wires 33V may be multilayered bodies including a plurality of conductive layers made of the metal materials described above or an alloy including one or more of the materials. The first conductive thin wires 33U and the second conductive thin wires 33V may be multilayered bodies including conductive layers made of translucent conductive oxide, such as ITO. Alternatively, the first conductive thin wires 33U and the second conductive thin wires 33V may be multilayered bodies including blackened films, black organic films, or black conductive organic films obtained by combining the metal materials and the conductive layers described above.

The metal materials described above have resistance lower than that of translucent conductive oxide, such as ITO. The metal materials described above have a light-shielding property higher than that of translucent conductive oxide, so that the transmittance may possibly be reduced, or the patterns of the second sensor electrodes TD may possibly be visually recognized. One second sensor electrode TD according to the present embodiment includes a plurality of first conductive thin wires 33U and a plurality of second conductive thin wires 33V having a narrow width. The first conductive thin wires 33U and the second conductive thin wires 33V are disposed with spaces larger than their width interposed therebetween. This configuration can reduce the resistance and prevent the second sensor electrodes TD from being visually recognized. As a result, the second sensor electrodes TD have lower resistance, and the display device 1 can have a smaller thickness, a larger screen, or higher definition.

The width of the first conductive thin wire 33U and that of the second conductive thin wire 33V are preferably 1 μm to 10 μm, and more preferably 1 μm to 5 μm. If the first conductive thin wire 33U and the second conductive thin wire 33V each have a width of 10 μm or smaller, the area covering apertures is reduced in the active area 10a, where the apertures correspond to regions in which transmission of light is not suppressed by a black matrix or the gate lines GCL and the data lines SGL. As a result, the aperture ratio is less likely to be reduced. If the first conductive thin wire 33U and the second conductive thin wire 33V each have a width of 1 μm or larger, they have a stable shape, thereby lowering the possibility of disconnection.

The second sensor electrode TD does not necessarily include mesh-shaped metal thin wires and may include, for example, a plurality of zigzag-line-shaped or wavy-line-shaped metal thin wires. Dummy electrodes not serving as detection electrodes may be provided between the second sensor electrodes TD. The dummy electrode may have a mesh-shaped, zigzag-line-shaped, or wavy-line-shaped pattern similar to that of the second sensor electrode TD. The electric potential of the dummy electrodes is not fixed.

As illustrated in FIG. 37, the second sensor electrode TD has the electric-field transmission region NE. The electric-field transmission region NE is provided with a plurality of dummy electrodes 33D, the electric potential of which is not fixed. The dummy electrodes 33D are not electrically coupled to each other. The dummy electrodes 33D are not electrically coupled to the first conductive thin wires 33U or the second conductive thin wires 33V. As described above, the electric potential of the dummy electrodes 33D is not fixed. With this configuration, the dummy electrodes 33D provide a smaller effect of shielding the fringe electric field (FIG. 24) in touch detection. As a result, in touch detection, the lines of electric force of the fringe electric field extend from the first sensor electrode CD toward the second sensor electrode TD.

The dummy electrode 33D includes a conductive thin wire having the same inclination as that of the first conductive thin wires 33U with respect to the direction parallel to the first direction Dx and a conductive thin wire having the same inclination as that of the second conductive thin wires 33V with respect to the direction parallel to the first direction Dx. This configuration prevents the electric-field transmission region NE from being visually recognized with respect to the first conductive thin wires 33U and the second conductive thin wires 33V.

The electric-field transmission region NE has the same length in the first direction Dx and the second direction Dy.

The electric-field transmission region NE overlaps the first electrode CD so as not to straddle two first sensor electrodes CD in planar view, thereby increasing the resolution. The shape of the electric-field transmission region NE is symmetric with respect to the first direction Dx and symmetric with respect to the second direction Dy. This configuration uniforms the degree of attenuation of signals associated with driving of one first sensor electrode CD according to the distance. This reduces the influence of driving of the first sensor electrode CD on driving of another first sensor electrode CD adjacent to the driven first sensor electrode CD.

First Modification

Figure 38:
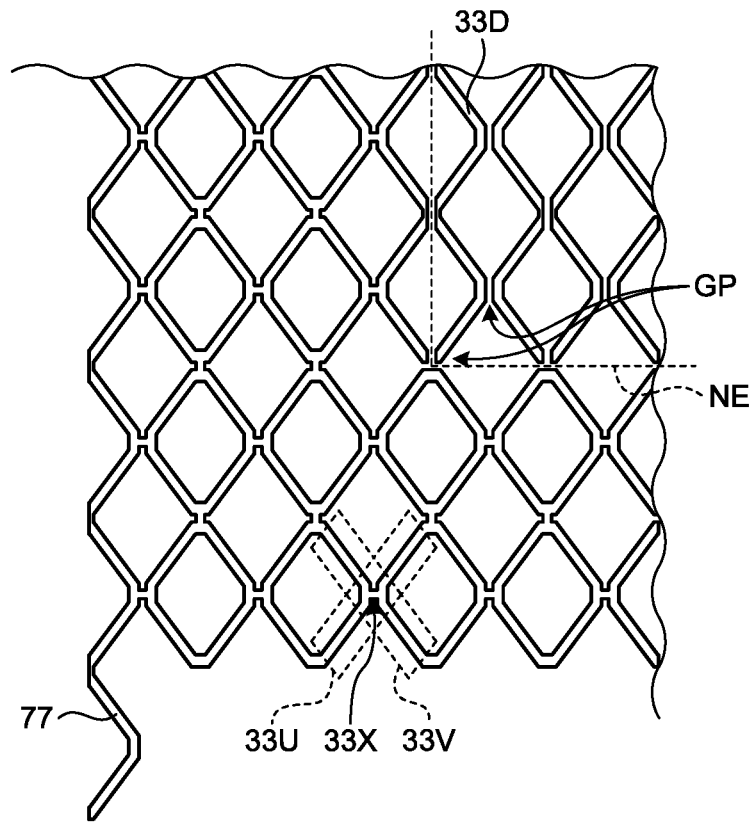
FIG. 38 is a partially enlarged view of the second sensor electrode according to a first modification of the sixth embodiment.

FIG. 38 is a partially enlarged view of the second sensor electrode according to a first modification of the sixth embodiment. The wire 77 according to the first modification has a zigzag-line or wavy-line shape. The wire 77 includes conductive thin wires having the same inclination as that of the first conductive thin wires 33U with respect to the direction parallel to the first direction Dx and conductive thin wires having the same inclination as that of the second conductive thin wires 33V with respect to the direction parallel to the first direction Dx. This configuration prevents the wire 77 from being visually recognized with respect to the first conductive thin wires 33U and the second conductive thin wires 33V.

In the configuration according to the first modification, the first conductive thin wires 33U and the second conductive thin wires 33V are coupled to each other to have a parallelogram shape. The dummy electrodes 33D are formed by the coupling portions 33X each having a slit GP without any conductive material in the electric-field transmission region NE. The electric-field transmission region NE also includes the dummy electrodes having the same configuration as that of the dummy electrodes 33D illustrated in FIG. 36.

Second Modification

Figure 39:
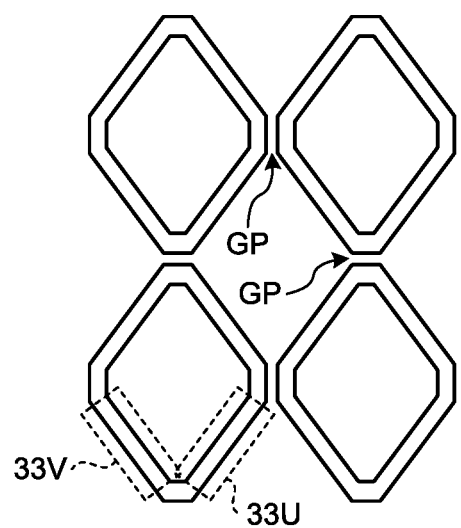
FIG. 39 is a partially enlarged view of the second sensor electrode according to a second modification of the sixth embodiment.

FIG. 39 is a partially enlarged view of the second sensor electrode according to a second modification of the sixth embodiment. In the configuration according to the second modification, two first conductive thin wires 33U and two second conductive thin wires 33V are coupled to each other to have a parallelogram shape. The conductive thin wires having a parallelogram shape are arrayed in the electric-field transmission regions NE (refer to FIG. 37).

While exemplary embodiments have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

The present disclosure includes the following aspects:

(1) A detection device, comprising:
a plurality of first sensor electrodes disposed side by side in a first direction and a second direction intersecting the first direction; and
a plurality of second sensor electrodes disposed side by side in the first direction and the second direction, wherein
one of the second sensor electrodes overlaps a plurality of first sensor electrodes out of the first sensor electrodes in planar view,
each of the second sensor electrodes has a plurality of electric-field transmission regions, and
one of the electric-field transmission regions overlaps a corresponding one of the first sensor electrodes in planar view and does not straddle two first sensor electrodes in planar view.

(2) The detection device according to (1), wherein a size of one of the second sensor electrodes in planar view is larger than a size of one of the first sensor electrodes.

(3) The detection device according to (1), wherein one of the electric-field transmission regions overlaps an area center of gravity of a corresponding one of the first sensor electrodes in planar view.

(4) The detection device according to any one of (1) to (3), wherein one of the electric-field transmission regions has a square shape.

(5) The detection device according to any one of (1) to (4), wherein one of the electric-field transmission regions has a square shape, and an extension of one side of one of the electric-field transmission regions intersects a side of a corresponding one of the first sensor electrodes overlapping the one of the electric-field transmission regions.

(6) The detection device according to any one of (1) to (3), wherein one of the electric-field transmission regions has a circular shape.

(7) The detection device according to any one of (1) to (3), wherein a plurality of electric-field transmission regions out of the electric-field transmission regions overlap a corresponding one of the first sensor electrodes in planar view.

(8) The detection device according to any one of (1) to (3), wherein one of the electric-field transmission regions has a cross shape.

(9) The detection device according to any one of (1) to (8), wherein a length of one of the electric-field transmission regions in the first direction passing through the area center of gravity of a corresponding one of the first sensor electrodes is equal to a length of the one of the electric-field transmission regions in the second direction.

(10) The detection device according to any one of (1) to (9), wherein the electric-field transmission regions are provided with a dummy electrode.

(11) The detection device according to (10), wherein an electric potential of the dummy electrode is not fixed.

(12) The detection device according to any one of (1) to (11), further comprising:
a drive circuit configured to supply a first drive signal to the first sensor electrodes and supply a second drive signal to the second sensor electrodes; and
a control circuit having a first detection mode of detecting an object being detected in contact with a detection surface based on a first detection signal corresponding to a change in mutual capacitance between the first sensor electrodes and the second sensor electrodes when the first drive signal is supplied to the first sensor electrodes, and a second detection mode of detecting the object being detected in a non-contact state with respect to the detection surface based on a second detection signal corresponding to a change in self-capacitance in the second sensor electrodes when the second drive signal is supplied to the second sensor electrodes.

(13) The detection device according to (12), further comprising:
a detection circuit, wherein
the detection circuit identifies, in the first detection mode, a first sensor electrode supplied with the first drive signal out of the first sensor electrodes and detects the object being detected in contact with the detection surface, in the corresponding electric-field transmission region of the corresponding second sensor electrode overlapping the first sensor electrode, based on the first detection signal corresponding to a change in mutual capacitance between the first sensor electrode and the corresponding second sensor electrode.

(14) The detection device according to any one of (1) to (13), wherein the second sensor electrodes are each made of a plurality of metal wires having a mesh, zigzag-line, or wavy-line shape.

(15) The detection device according to (12), wherein the drive circuit supplies a signal synchronized with the second drive signal and having an electric potential identical to an electric potential of the second drive signal to the first sensor electrodes in the second detection mode.

(16) A detection device, comprising:
a plurality of first sensor electrodes disposed side by side in a first direction and a second direction intersecting the first direction;
a plurality of second sensor electrodes disposed side by side in the first direction and the second direction;
a drive circuit configured to supply a first drive signal to the first sensor electrodes and supply a second drive signal to the second sensor electrodes; and
a control circuit having a first detection mode of detecting an object being detected in contact with a detection surface based on a first detection signal corresponding to a change in mutual capacitance between the first sensor electrodes and the second sensor electrodes when the first drive signal is supplied to the first sensor electrodes, and a second detection mode of detecting the object being detected in a non-contact state with respect to the detection surface based on a second detection signal corresponding to a change in self-capacitance in the second sensor electrodes when the second drive signal is supplied to the second sensor electrodes, wherein
one of the second sensor electrodes overlaps a plurality of first sensor electrodes out of the first sensor electrodes in planar view.

(17) The detection device according to (16), wherein
one of the second sensor electrodes has a plurality of electric-field transmission regions, and
one of the electric-field transmission regions overlaps a corresponding one of the first sensor electrodes in planar view and does not straddle two first sensor electrodes in planar view.

(18) The detection device according to (16) or (17), further comprising:
a detection circuit, wherein
the detection circuit identifies, in the first detection mode, a first sensor electrode supplied with the first drive signal out of the first sensor electrodes and detects the object being detected in contact with the detection surface, in the corresponding electric-field transmission region of the corresponding second sensor electrode overlapping the first sensor electrode, based on the first detection signal corresponding to a change in mutual capacitance between the first sensor electrode and the corresponding second sensor electrode.

(19) A display device, comprising:
the detection device according to any one of (1) to (18); and
a display panel including a display region, wherein
the second sensor electrodes are provided in a region overlapping the display region.

What is claimed is:
1. A detection device, comprising:
a first substrate;
a plurality of first sensor electrodes disposed side by side in a first direction and a second direction intersecting the first direction, in a layer parallel to the first substrate;
a plurality of second sensor electrodes disposed side by side in the first direction and the second direction; and
a plurality of electric-field transmission regions in each of the second sensor electrodes, wherein, when viewed from a third direction perpendicular to the first substrate:
one of the second sensor electrodes overlaps the first sensor electrodes corresponding to the one of the second sensor electrodes;
one of the electric-field transmission regions overlaps a corresponding one of the first sensor electrodes each having an area greater than an area of each of the electric-field transmission regions; and
the one of the electric-field transmission does not straddle two first sensor electrodes.

2. The detection device according to claim 1, wherein, when viewed from the third direction, a size of one of the second sensor electrodes is larger than a size of one of the first sensor electrodes.

3. The detection device according to claim 1, wherein one of the electric-field transmission regions overlaps an area center of gravity of a corresponding one of the first sensor electrodes when viewed from the third direction.

4. The detection device according to claim 1, wherein one of the electric-field transmission regions has a square shape.

5. The detection device according to claim 1, wherein one of the electric-field transmission regions has a square shape, and an extension of one side of one of the electric-field transmission regions intersects a side of a corresponding one of the first sensor electrodes overlapping the one of the electric-field transmission regions.

6. The detection device according to claim 1, wherein one of the electric-field transmission regions has a circular shape.

7. The detection device according to claim 1, wherein a plurality of electric-field transmission regions out of the electric-field transmission regions overlap a corresponding one of the first sensor electrodes when viewed from the third direction.

8. The detection device according to claim 1, wherein one of the electric-field transmission regions has a cross shape.

9. The detection device according to claim 1, wherein a length of one of the electric-field transmission regions in the first direction passing through the area center of gravity of a corresponding one of the first sensor electrodes is equal to a length of the one of the electric-field transmission regions in the second direction.

10. The detection device according to claim 1, wherein the electric-field transmission regions are provided with a dummy electrode.

11. The detection device according to claim 10, wherein an electric potential of the dummy electrode is not fixed.

12. The detection device according to claim 1, further comprising:
a drive circuit configured to supply a first drive signal to the first sensor electrodes and supply a second drive signal to the second sensor electrodes; and
a control circuit having a first detection mode of detecting an object being detected in contact with a detection surface based on a first detection signal corresponding to a change in mutual capacitance between the first sensor electrodes and the second sensor electrodes when the first drive signal is supplied to the first sensor electrodes, and a second detection mode of detecting the object being detected in a non-contact state with respect to the detection surface based on a second detection signal corresponding to a change in self-capacitance in the second sensor electrodes when the second drive signal is supplied to the second sensor electrodes.

13. The detection device according to claim 12, further comprising:
a detection circuit, wherein
the detection circuit identifies, in the first detection mode, a first sensor electrode supplied with the first drive signal out of the first sensor electrodes and detects the object being detected in contact with the detection surface, in the corresponding electric-field transmission region of the corresponding second sensor electrode overlapping the first sensor electrode, based on the first detection signal corresponding to a change in mutual capacitance between the first sensor electrode and the corresponding second sensor electrode.

14. The detection device according to claim 1, wherein the second sensor electrodes are each made of a plurality of metal wires having a mesh, zigzag-line, or wavy-line shape.

15. The detection device according to claim 12, wherein the drive circuit supplies a signal synchronized with the second drive signal and having an electric potential identical to an electric potential of the second drive signal to the first sensor electrodes in the second detection mode.

16. A display device, comprising:
the detection device according to claim 1; and
a display panel including a display region, wherein
the second sensor electrodes are provided in a region overlapping the display region.

17. The detection device according to claim 1, wherein a length of the respective electric-field transmission regions in the second direction is less than a length of the respective first sensor electrodes in the second direction.

18. A detection device, comprising:
a first substrate;
a plurality of first sensor electrodes disposed side by side in a first direction and a second direction intersecting the first direction, in a layer parallel to the first substrate;
a plurality of second sensor electrodes disposed side by side in the first direction and the second direction;
a plurality of electric-field transmission regions in each of the second sensor electrodes;
a drive circuit configured to supply a first drive signal to the first sensor electrodes and supply a second drive signal to the second sensor electrodes; and
a control circuit having:
a first detection mode of detecting an object being detected in contact with a detection surface based on a first detection signal corresponding to a change in mutual capacitance between the first sensor electrodes and the second sensor electrodes when the first drive signal is supplied to the first sensor electrodes, and a second detection mode of detecting the object being detected in a non-contact state with respect to the detection surface based on a second detection signal corresponding to a change in self-capacitance in the second sensor electrodes when the second drive signal is supplied to the second sensor electrodes, wherein, when viewed from a third direction perpendicular to the first substrate:

one of the second sensor electrodes overlaps the first sensor electrodes corresponding to the one of the second sensor electrodes;

one of the electric-field transmission regions overlaps a corresponding one of the first sensor electrodes each having an area greater than an area of each of the electric-field transmission regions; and the one of the electric-field transmission does not straddle two first sensor electrodes when viewed from the third direction.

19. The detection device according to claim 18, further comprising:

a detection circuit, wherein the detection circuit identifies, in the first detection mode, a first sensor electrode supplied with the first drive signal out of the first sensor electrodes and detects the object being detected in contact with the detection surface, in the corresponding electric-field transmission region of the corresponding second sensor electrode overlapping the first sensor electrode, based on the first detection signal corresponding to a change in mutual capacitance between the first sensor electrode and the corresponding second sensor electrode.

20. A display device, comprising:

the detection device according to claim 18; and a display panel including a display region, wherein the second sensor electrodes are provided in a region overlapping the display region.

* * * * *